(12) United States Patent
Kadowaki

(10) Patent No.: US 7,154,618 B2
(45) Date of Patent: Dec. 26, 2006

(54) DATA PROCESSING METHOD IN NETWORK SYSTEM CONNECTED WITH IMAGE PROCESSING APPARATUS

(75) Inventor: Toshihiro Kadowaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/669,332

(22) Filed: Sep. 25, 2003

(65) Prior Publication Data

US 2004/0057068 A1  Mar. 25, 2004

Related U.S. Application Data

(62) Division of application No. 09/094,722, filed on Jun. 15, 1998, now Pat. No. 6,674,537.

(30) Foreign Application Priority Data

Jun. 20, 1997  (JP)  ................................ 9-180701

(51) Int. Cl.
*G06K 13/00* (2006.01)
*H04N 1/32* (2006.01)
*G06F 15/00* (2006.01)

(52) U.S. Cl. .................................... 358/1.13; 358/1.15
(58) Field of Classification Search ............... 358/1.12, 358/1.13, 1.14, 1.15, 1.18, 1.5; 399/1; 345/173
See application file for complete search history.

(56) References Cited

U.S. PATENT DOCUMENTS

| | | | | |
|---|---|---|---|---|
| 5,049,931 A | * | 9/1991 | Knodt ........................... | 399/81 |
| 5,091,746 A | | 2/1992 | Watanabe .................... | 355/202 |
| 5,115,501 A | * | 5/1992 | Kerr ............................... | 707/9 |
| 5,177,621 A | * | 1/1993 | Ohtaki et al. ................ | 358/406 |
| 5,208,683 A | | 5/1993 | Okada ........................... | 358/468 |
| 5,267,303 A | | 11/1993 | Johnson et al. .............. | 379/100 |
| 5,425,140 A | * | 6/1995 | Bloomfield et al. ......... | 715/841 |
| 5,438,433 A | | 8/1995 | Reifman et al. ............. | 358/468 |
| 5,535,120 A | * | 7/1996 | Chong et al. .................. | 704/3 |
| 5,592,307 A | | 1/1997 | Murai .......................... | 358/468 |
| 5,615,015 A | | 3/1997 | Krist et al. .................. | 358/296 |
| 5,630,079 A | | 5/1997 | McLaughlin ................ | 395/335 |
| 5,699,494 A | | 12/1997 | Collbert et al. ............. | 395/114 |

(Continued)

FOREIGN PATENT DOCUMENTS

EP  679 014  10/1995

(Continued)

OTHER PUBLICATIONS

Patent Abstracts of Japan, vol. 016, No. 300, for JP 04081069 published Mar. 13, 1992.

(Continued)

*Primary Examiner*—Thomas D. Lee
(74) *Attorney, Agent, or Firm*—Fitzpatrick, Cella, Harper & Scinto

(57) ABSTRACT

When an ID card (41, 81) including user ID stored therein is set in an image processing apparatus (1, 71), the user ID is read out of the IC card. Upon depression of a key instructing individual setting, ID information including the user ID and apparatus ID is transmitted to a computer terminal (3; 3-1, 3-2) which stores a plurality of user ID's and setting information corresponding to the apparatus. Responding to the ID information transmitted, the computer terminal transmits individual setting information stored therein for each user back to the image processing apparatus, whereupon the apparatus stores the individual setting information in a memory and realizes the individual setting for each user, which corresponds to the set user ID, in a control panel (8) of the apparatus.

6 Claims, 25 Drawing Sheets

U.S. PATENT DOCUMENTS

| | | | | |
|---|---|---|---|---|
| 5,727,135 A | | 3/1998 | Webb et al. | 395/113 |
| 5,768,657 A | * | 6/1998 | Kimura et al. | 399/81 |
| 5,818,606 A | * | 10/1998 | Muramatsu et al. | 358/405 |
| 5,841,076 A | | 11/1998 | Schwartz et al. | 177/25.13 |
| 5,875,242 A | | 2/1999 | Glaser et al. | 379/207 |
| 5,907,319 A | * | 5/1999 | Hashimoto et al. | 345/173 |
| 5,917,615 A | | 6/1999 | Reifman et al. | 358/468 |
| 6,069,706 A | | 5/2000 | Kajita et al. | 358/1.15 |
| 6,163,799 A | * | 12/2000 | Kambayashi et al. | 709/204 |
| 6,229,620 B1 | * | 5/2001 | Makitani et al. | 358/1.15 |
| 6,253,375 B1 | | 6/2001 | Gordon et al. | 725/88 |
| 6,532,077 B1 | * | 3/2003 | Arakawa | 358/1.13 |

FOREIGN PATENT DOCUMENTS

| | | |
|---|---|---|
| EP | 0 756 414 A2 | 1/1997 |
| GB | 2 234 879 A | 2/1991 |
| JP | 06-233046 | 8/1994 |
| JP | 07-079306 | 3/1995 |
| JP | 07-170356 | 7/1995 |
| JP | 09-097156 | 4/1997 |
| JP | HEI9(1997)-130532 | 5/1997 |

OTHER PUBLICATIONS

Patent Abstracts of Japan, vol. 006, No. 088, for JP 57024960 published Feb. 9, 1982.
Patent Abstracts of Japan, vol. 018, No. 084, for JP 05292281 published Nov. 5, 1993.
K.G. Bunker, "Display and Edit of Job Names Stored On A Memory Card," Xerox Disclosur Journal vol. 20 No. 1, Jan. 1, 1995, p. 35.
Patent Abstracts of Japan, vol. 161, No. 96, (E-1200), May 12, 1992 (JP 4-029454 A).

* cited by examiner 40-7

FIG. 26

```
#START#                          L101
#KEY#72dpi#                      L102
#DO:res_mode=72;END#             L103
#KEY#100dpi#                     L104
#DO:res_mode=100;END#            L105
#KEY#200dpi#                     L106
#DO:res_mode=200;END#            L107
#KEY#300dpi#                     L108
#DO:res_mode=300;END#            L109
#KEY#400dpi#                     L110
#DO:res_mode=400;END#            L111
#KEY#600dpi#                     L112
#DO:res_mode=600;END#            L113
#END#                            L114
```

FIG. 27

```
#START#                          L201
#KEY#standard#                   L202
#DO:res_mode=72;END#             L203
#KEY#fine#                       L204
#DO:res_mode=200;END#            L205
#KEY#super fine#                 L206
#DO:res_mode=400;END#            L207
#END#                            L208
```

DATA PROCESSING METHOD IN NETWORK SYSTEM CONNECTED WITH IMAGE PROCESSING APPARATUS

This application is a division of application Ser. No. 09/094,722, filed on Jun. 15, 1998, now U.S. Pat. No. 6,674,537 the entire disclosure of which is incorporated herein by reference.

BACKGROUND OF THE INVENTION

1. Field of the Invention

The present invention relates to a data processing method in a network system to which a plurality of terminals, including an image processing apparatus capable of processing image data, can be connected.

2. Description of the Related Art

Hitherto, when reading and transmitting a document image with a facsimile, for example, the setting of a reading mode, designation of the destination (partner), etc. have been executed by complicated key-in operations on a control panel.

For the purpose of making simpler the operation to be performed on the control panel, it is known to store various settings beforehand and to read out a desired one of the settings for use upon request.

There are conventionally known, e.g., the registering functions listed below.

1) Registration of Destination Numbers

This is a function to store a plurality of destination (receiving party) facsimile (FAX) numbers for FAX transmission. Usually, the stored destination FAX numbers are not erased even after a machine power supply is turned off. By registering frequently used destination FAX numbers with the function of registering destination numbers, users can call the desired one of the registered FAX numbers by simple operation and hence are no longer required to enter the individual destination FAX numbers again for each FAX transmission.

2) Registration of Default Transmission Mode

This is a function to set a default transmission mode. The term "default transmission mode" means an initial transmission mode established when the settings in the control panel related to image transmission are reset or cleared. With regard to reading image quality, for example, "standard" or "fine (high image quality)" is designated as a default mode. This default transmission mode information is also not erased even after the machine power supply is turned off.

3) Registration of Cover Page

There is a function to attach a cover page to the head of FAX data in FAX transmission. With this cover page registration, users can register the contents of a cover page. The cover page registered information is also not erased even after the machine power supply is turned off.

However, the conventional facsimile described above has had the following problems.

1) Because the facsimile is employed by a plurality of users in common, the various settings of the destination FAX number registration, etc. each have a limit in number capable of being registered. Accordingly, it often occurs that in spite of desiring to register frequently used destination FAX numbers, every user cannot register all of the destination FAX numbers due to a shortage of the registration area, or it happens that the destination FAX numbers registered by one user are overwritten and erased by another user.

2) The various settings of the destination FAX number registration, etc. are independent for each facsimile. Therefore, the operating process to be made by users on a facsimile A and the operating process to be made by users on a facsimile B may be different even for the same model. This raises the problem that users have to keep in mind the difference in operating process; hence operability is deteriorated. Further, because the setting process, etc. are necessarily different depending on different models of facsimiles, users also have to keep in mind such a difference in operating process as well.

3) To prevent various information from being erased even after the machine power supply is turned off, relatively expensive nonvolatile memories are used in each facsimile to store various setting data. The conventional facsimile cannot therefore store a large amount of setting data, complex image data, etc. from the viewpoint of cost. For that reason, the number of the destination FAX numbers capable of being registered, for example, is limited. In addition, since a complicated cover page includes a large amount of data and needs a nonvolatile memory of large capacity, it has been required to form a cover page with simple images which are less flexible in content.

SUMMARY OF THE INVENTION

An object of the present invention is to provide an image processing apparatus which is free from the problems stated above.

Anther object of the present invention is to improve operability of an image processing apparatus.

Still another object of the present invention is to permit easy selection of one set of data in setting information stored in a memory accessible by a plurality of terminals on a network, which is adapted for an image processing apparatus in target, thus enabling the image processing apparatus to be subjected to setting.

Still another object of the present invention is to enable a setting screen in a control panel of the image processing apparatus to be easily established as desired by individual users.

Still another object of the present invention is to enable the operating environment, which is set by using the image processing apparatus, to be also set in another apparatus connected to the network.

According to one aspect of the present invention is provided an image processing apparatus that has an input unit, a processor to perform a job based on the input image data, and an operation unit, to display an operation screen for the job to be performed by the processor and to accept a user operation. Also provided are an entering unit, adapted to enter a user ID and a machine group ID, and a controller, to change parameters to be displayed on the operation screen of the operation unit based on the user ID entered by the entering unit, the parameters being for processing the input image data and being selectable by a user corresponding to the user ID entered by the entering unit.

According to another aspect of the present invention is provided an image processing method in which image data is input, an operation screen is displayed for a job to be performed on the image data, a user inputs a user ID and a machine group ID, and parameters displayed on the screen are changed based on the user ID.

According to another aspect of the present invention is provided an image processing apparatus that comprises an input unit, a processor to perform a job based on input image data, and an operation unit, to display an operation screen for the job to be performed by the processor and to accept a user operation based on the operation screen. The apparatus also is provided with an entering unit, to enter identification information corresponding to a user, and a controller, that selects, from among a plurality of languages, a language used for a term to be displayed in the operation screen of said operation unit based on the identification information entered by the entering unit.

According to another aspect of the present invention is provided an image processing method in which image data is input, an operation screen is displayed for a job to be performed on the image data, a user inputs identification information corresponding to the user, and a language for a term that is to be displayed on the operation screen is selected, from among a plurality of languages, based on the identification information.

Tangibly embodied program products for performing the mentioned methods are further aspects of the invention.

The above and other objects of the present invention will be apparent from the following detailed description with reference to the drawings.

BRIEF DESCRIPTION OF THE DRAWINGS

FIGS. 26 and 27 show, in the script form, examples of an operating process for designating the resolution of transmission in the color copying machine according to the third embodiment of the present invention.

DETAILED DESCRIPTION OF THE PREFERRED EMBODIMENTS

[Embodiment 1]

Figure 1:
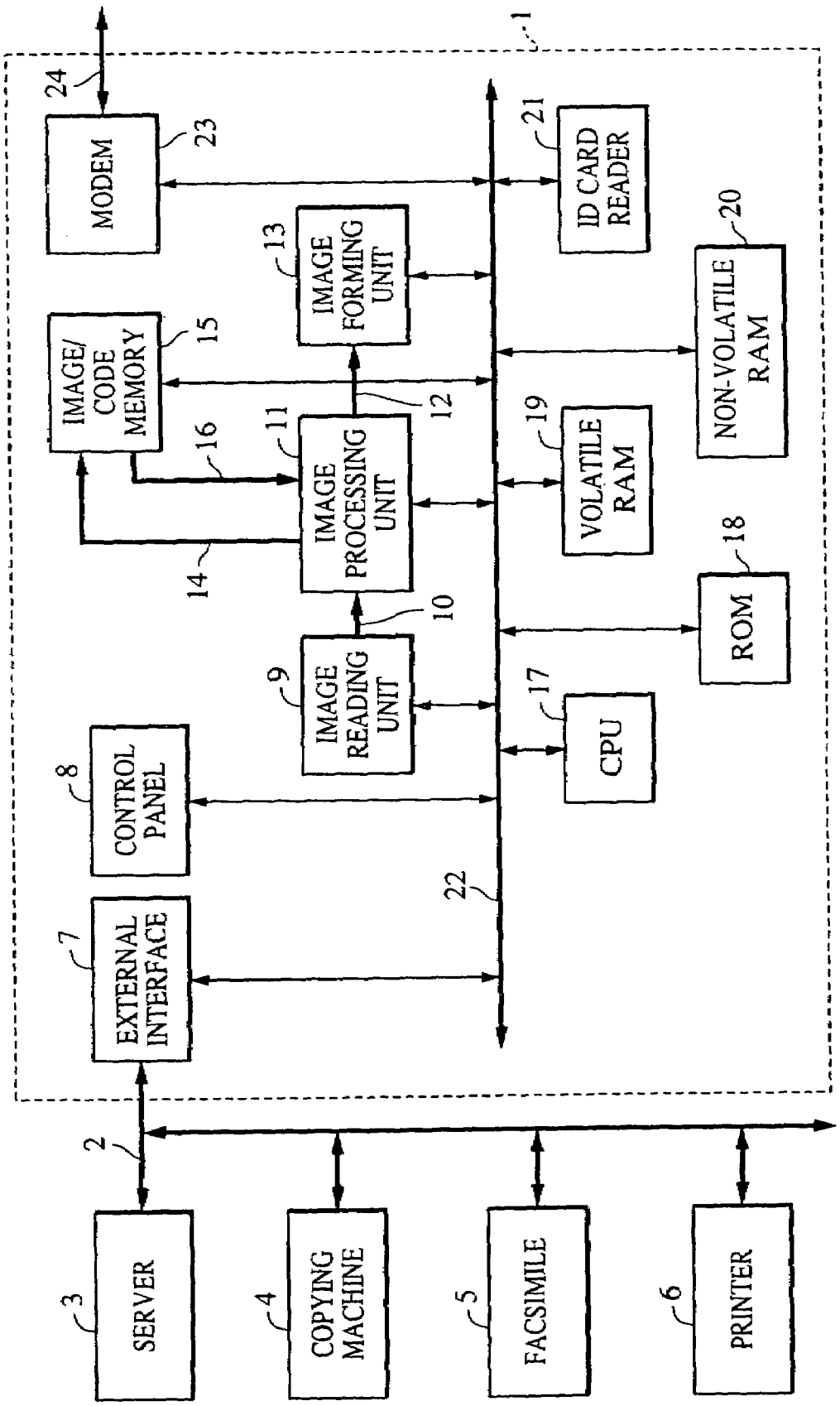
FIG. 1 is a block diagram showing the configuration of a facsimile according to a first embodiment of the present invention.

FIG. 1 is a block diagram showing the configuration of a facsimile according to a first embodiment of the present invention. As shown in FIG. 1, a facsimile 1 according to the present invention comprises an external interface 7, a control panel 8, an image reading unit 9, an image processing unit 11, an image forming unit 13, an image/code memory 15, a CPU (Central Processing Unit) 17, a ROM (Read Only Memory) 18, a volatile RAM (Random Access Memory) 19, a nonvolatile RAM 20, an ID (identification) card reader 21, a CPU bus 22, and a modem 23, these parts being connected to the CPU bus 22.

The facsimile 1 is connected to a server 3 via a network 2. Individual setting information, described later, is transmitted and received between the facsimile 1 and the server 3 via the network 2. In addition to the facsimile 1 and the server 3, a copying machine 4, another facsimile 5 and a printer 6 are also connected to the network 2 to be able to transmit and receive individual setting information with respect to the server 3 via the network 2.

The operation of the facsimile 1 according to the first embodiment of the present invention will now be described.

In FAX (facsimile) transmission, digital image data 10 in the raster form obtained by reading a document image by the image reading unit 9 is sent to the image processing unit 11 where image processing such as a FAX resolution conversion process is carried out. Image data (raster image data) 14 in the raster form resulting from the image processing such as the FAX resolution conversion process is written in the image/code memory 15. The image data written in the image/code memory 15 is coded by the CPU 17 using the ME (Modified Read) method or the like and then written as coded data in the image/code memory 15 again. After that, the coded data read out of in the image/code memory 15 by the CPU 17 is modulated by the modem 23 and then transmitted to a destination facsimile via a public line 24.

On the other hand, in FAX reception, the modulated data received via the public line 24 is demodulated into the coded data by the modem 23. The demodulated coded data is first written in the image/code memory 15 and then decoded by the CPU 17, followed by being written as raster image data in the image/code memory 15 again. Raster image data 16 read out the image/code memory 15 is subjected in the image processing unit 11 to the image processing such as the FAX resolution conversion process. Raster image data 12 resulting from the image processing such as the FAX resolution conversion process is sent to the image forming unit 13 where an image is formed.

Various settings required for the above-mentioned image data reading process, processing of the transmitted image data, process of transmitting image data to the destination facsimile, processing of the received image data, and image data forming process are made by users on the control panel 8. In accordance with programs stored in the ROM 18, the CPU 17 controls the components of the facsimile 1 based on the settings made on the control panel 8, and carries out the FAX transmitting process and the FAX receiving process corresponding to the settings designated.

The ROM 18 is a non-rewritable memory such that data once stored therein is not lost even after a power supply (not shown) of the facsimile 1 is turned off. The ROM 18 is used to hold various control programs and fixed data. The volatile RAM 19 is an inexpensive rewritable memory such that data stored therein is lost or volatilized when the power supply of the facsimile 1 is turned off. The RAM 19 is used to hold data temporarily. The nonvolatile RAM 20 is a relatively expensive rewritable memory such that data stored therein is not lost even after the power supply of the facsimile 1 is turned off. The RAM 20 is used to hold data to be stored for a long time of period.

The ID card reader 21 is used to read data stored in an ID card possessed by individual users and to take in ID information. In the first embodiment, the ID card reader 21 is a contact type card reader reading ID information from the ID card inserted in the ID card reader 21. The external interface 7 is an interface through which the CPU 17 executes data communication with respect to the server 3 via the network 2.

Figure 2:
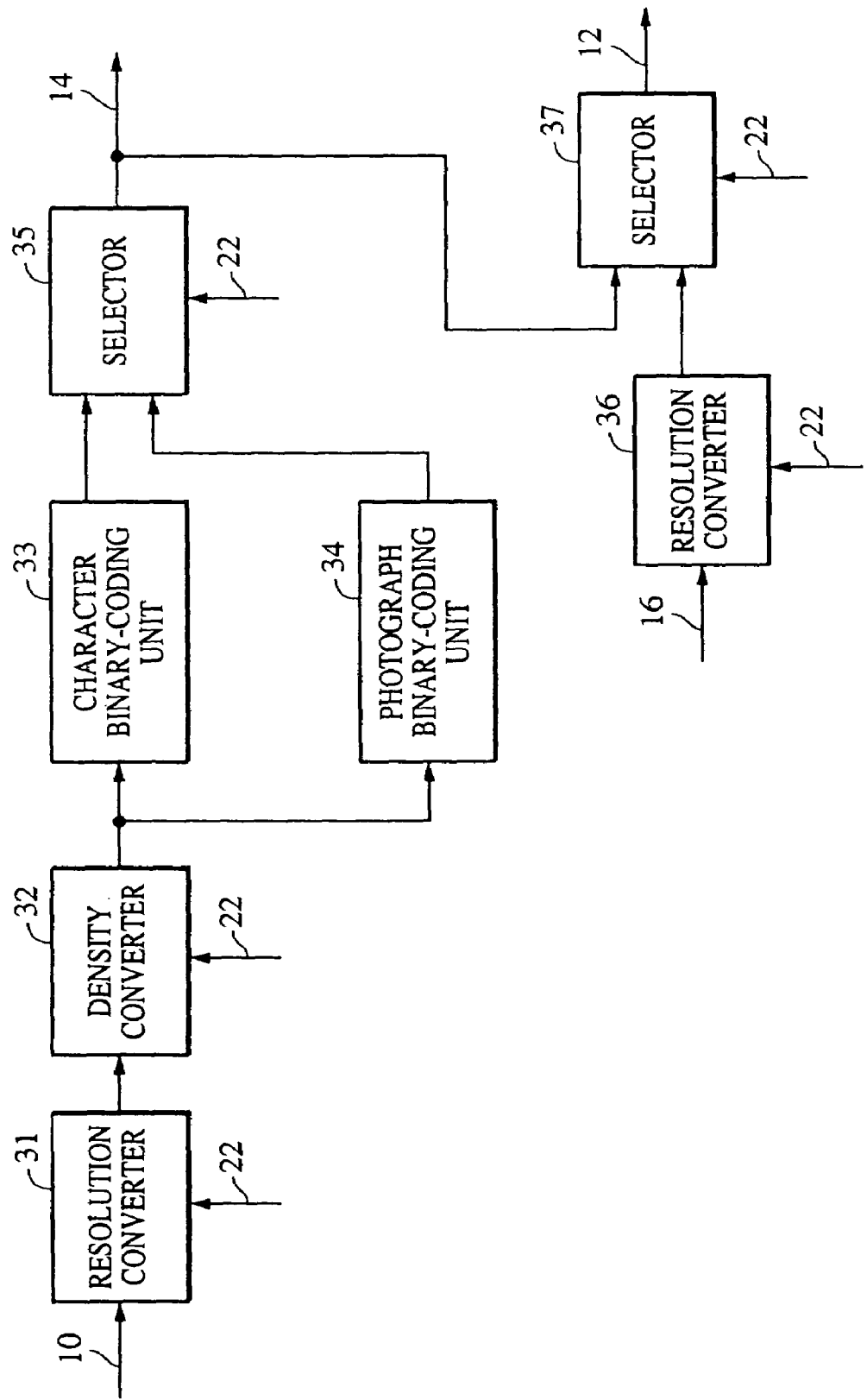
FIG. 2 is a block diagram showing the configuration of an image processing unit of the facsimile according to the first embodiment of the present invention.

FIG. 2 is a block diagram showing the configuration of the image processing unit 11 of the facsimile 1 according to the first embodiment of the present invention. In FAX transmission, the raster image data 10 output from the image reading unit 9 is multi-value high-resolution image data for each pixel and converted to have a predetermined resolution (pixel density) by a resolution converter 31. The facsimile 1 has three steps of resolution, i.e., "standard (8 pel×3.85 dot/mm)", "fine (8 pel×7.7 dot/mm)", and "superfine (8 pel×15.4 dot/mm)", optionally selectable by users in the FAX transmission. In the case where the resolution selected by the user is "standard" or "fine", reading a document image at the resolution of "superfine" requires a process for lowering the resolution of the raster image data 10. To this end, a process parameter corresponding to the resolution selected by the user is set in the resolution converter 31 by the CPU 17 via the CPU bus 22.

The raster image data of which resolution has been converted by the resolution converter 31 in accordance with the process parameter corresponding to the resolution to be achieved is adjusted in density by a density converter 32. The facsimile 1 has a total of eleven options selectable by users in the FAX transmission, i.e., standard density, five steps of low (light) density, and five steps of high (dark) density. A process parameter corresponding to the density adjustment value selected by the user is set in the density converter 32 by the CPU 17 via the CPU bus 22.

The raster image data of which density has been converted by the density converter 32 in accordance with the process parameter corresponding to the density adjustment value selected by the user is input to a character binary-coding unit 33 and a photograph binary-coding unit 34 where the input data is binary-coded by respective methods that are different from each other. The character binary-coding unit 33 performs a process suitable for binary-coding a character image, e.g., a simple binary-coding process, and the photograph binary-coding unit 34 performs a process suitable for binary-coding a photograph image, e.g., a pseudo-half tone process based on the dither method.

Outputs of the character binary-coding unit 33 and the photograph binary-coding unit 34 are both input to a selector 35 which selects one of the outputs. The selected output is supplied as binary-coded data 14 to the image/code memory 15. The facsimile 1 has two image modes, i.e., "character" and "photograph", selectable by users in the FAX transmission. Corresponding to the selected image mode, one of the outputs of the character binary-coding unit 33 and the photograph binary-coding unit 34 is selected by the selector 35.

Next, in FAX reception, the raster image data 16 read out of the image/code memory 15 is converted by the resolution converter 36 to a resolution suitable for an image forming process to be carried out in the image forming unit 13. The image forming unit 13 forms an image at the resolution of "superfine". On the other hand, there are three steps of resolution, i.e., "standard", "fine" and "superfine", for the raster image data 16 transmitted from a partner facsimile via the public line 24. Therefore, when the resolution of the received raster image data 16 is "standard" or "fine", a process for converting the resolution is required. Raster image data subjected to the resolution converting process is output as the image data 12 to the image forming unit 13 through the selector 37, and a visible image of the image data 12 is formed in the image forming unit 13.

In addition, the selector 37 can also select the binary-coded data 14 resulting from binary-coding the image data read by the image reading unit 9. Accordingly, the apparatus can realize the so-called local copying function with which the image read by the image reading unit 9 is formed as is by the image forming unit 13 without the resolution converting process.

Figure 3:
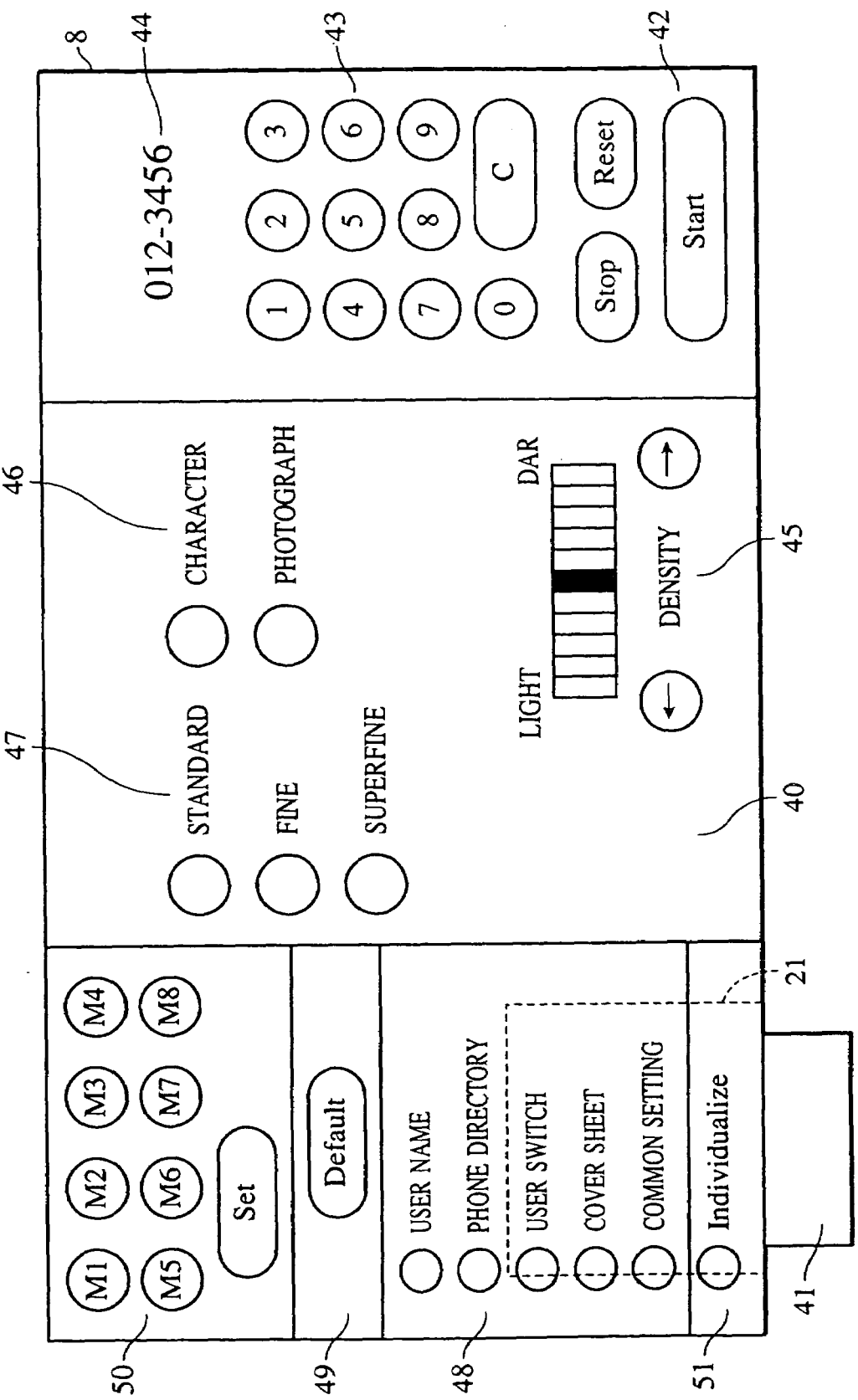
FIG. 3 is a representation showing the arrangement of keys and a display on a control panel of the facsimile according to the first embodiment of the present invention.

FIG. 3 is a representation showing the arrangement of keys and a display on the control panel 8 of the facsimile 1 according to the first embodiment of the present invention. In FAX transmission, the control panel 8 is employed by users to not only command the operation for the FAX transmission and perform other settings for the facsimile 1, but also confirm the situation of the facsimile 1 including the operation commands for the FAX transmission and other settings which are currently set.

In an area 42 of the control panel 8, there are disposed a reset key for returning the operation commands for the FAX transmission to initial states, a start key for starting the FAX transmitting operation, and a stop key for stopping the FAX transmitting operation. An area 43 includes numeral ten keys for setting the phone number of the FAX destination and a C (clear) key for clearing the set phone number. An area 44 for indicating the FAX destination indicates the phone number of the FAX destination entered through the ten keys.

The areas 42 to 44 on the right side of the control panel 8 and later-described areas 48 to 51 on the left side thereof are made up of fixed keys and LEDs (Light Emitting Diodes). Further, a central area 40 of the control panel 8 is made up of a liquid crystal display portion and a transparent touch panel arranged over it. The central area 40 makes it possible to display any desired screen and arrange keys in any desired positions.

In a normal state including no individual setting, information shown in FIG. 3 is displayed in the central area 40. An area 45 indicating density of image data in the FAX transmission is operated by arrow-headed keys on the left and right sides. The current density setting value is indicated in the form a bar and can be selected from a total of eleven density steps. The selected density is referred to by the density converter 32 carrying out the density converting process.

An area 46 indicating an image mode in the FAX transmission enables either a process suitable for a character image or a process suitable for a photograph image to be selected. This corresponds to the output of the character binary-coding unit 33 or the output of the photograph binary-coding unit 34 being selected by the selector 35 shown in FIG. 2.

An area 47 is used to designate the resolution of image data in the FAX transmission, and the resolution converting process is carried out by the resolution converter 31 based on the selected resolution.

In the above description, the phone number of the FAX destination, the density of the transmitted image data, the transmitted image data mode, and the resolution of the transmitted image data are parameters of the respective operation commands for the FAX transmission and are called together a transmitting mode. These parameters of the transmitting mode are returned to the initial states by the reset key. In the FAX reception, the start key is not required because image data is automatically printed when received from the opponent facsimile. Also, the operation in the FAX reception is instructed from the FAX source in many cases.

In an area 48, there are disposed entry keys for call setting screens of various auxiliary functions. In the case of setting the user name, when a user name key in the area 48 is depressed, a screen for setting the user name is displayed on the central area 40 and the user name can be set on the screen through a touch panel. The setting screens of various auxiliary functions will be described later. Additionally, values set by those auxiliary functions are not affected upon the reset key being depressed.

An area 49 includes a default key for setting a default transmission mode. In the default transmission mode, respective initial values of the transmission mode are set in the control panel 8 when the power supply of the facsimile 1 is turned on or when the reset key in the area 42 is depressed. The default transmission mode is registered by setting desired initial values of the transmission mode in the control panel 8 and thereafter depressing the default key in the area 49.

For example, when the default key is depressed on the condition that "character" in the area 46 is selected in setting of the image mode and "fine" in the area 47 is selected as resolution, those settings are registered as the default mode. Accordingly, when the power supply of the facsimile 1 is turned on or when the reset key in the area 42 is depressed, the facsimile 1 is powered on in a state where "character" is selected as the image mode and "fine" is selected as resolution.

In an area 50, there are disposed one-touch dial calling keys (M1 key to M8 key) and one-touch dial registering key (set key). These one-touch dial keys are employed to register the phone numbers of the FAX destinations. Because the M1 to M8 keys each correspond to one phone number, a total of eight phone numbers can be registered. In one-touch dial registration, a desired phone number is registered corresponding to the M1 key, for example, by setting that phone number in the panel control 8 and then depressing the M1 key while keeping the set key depressed. Any phone number stored by the one-touch dial registration can be called just by depressing one of the M1 to M8 keys. By so doing, the corresponding registered phone number is automatically set as the FAX destination and indicated in the area 44 of the control panel 8.

The ID card reader 21 is provided in a lower portion of the control panel 8 and reads ID information via not-shown contacts when an ID card 41 is inserted. Here, the term "ID card" means a portable storage medium holding therein ID information to identify each of individual users. At the present, the ID card is generally in the form of a card constructed as a magnetic card or an IC card (hereinafter referred to as an ID card). Such an ID card having a function to transmit various information has been already in use in copying machines, etc. By electrically connecting an end of the ID card 41 and the ID card reader 21 through a connector (not shown), for example, ID information written in a memory (not shown) of the ID card 41 is read out.

An area 51 includes an individualize key. By depressing the individualize key with the ID card 41 inserted in the ID card reader 21, each setting in the control panel 8 is performed as an individual setting for each user.

FIGS. 4 to 8 are representations for explaining setting screens of various auxiliary functions displayed in the area 40 when respective entry keys in the area 48 of the control panel 8 shown in FIG. 3 are depressed.

Figure 4:
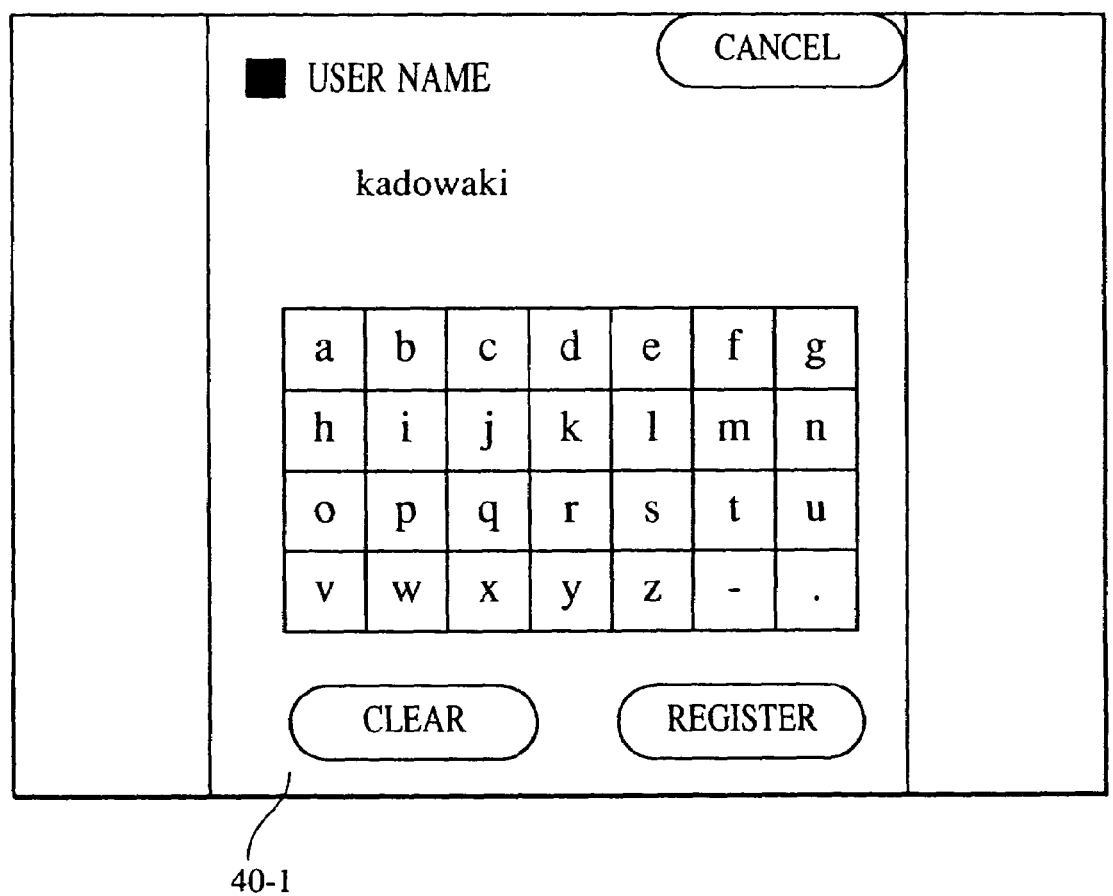
FIG. 4 is a representation showing a user name setting screen displayed on the control panel of the facsimile according to the first embodiment of the present invention.

FIG. 4 is a representation showing a user name setting screen 40-1 displayed when the user name key is depressed. The term "user name" means the name of a transmitting person in the FAX transmission. In the case where the individual setting is not made effective in the facsimile 100 according to the first embodiment, a fixed user name common to individual users can be employed. In the case where the individual setting is made effective, different user names for personal use of individuals can be employed for each user.

Upon the user name key being depressed, the user name effective at that time is displayed in the area 40 for verification, as shown in FIG. 4, regardless of whether the individual setting is executed or not. The user name setting screen 40-1 can be canceled by depressing a cancel key. The user name can be changed by depressing the clear key on the user name setting screen 40-1 to clear the user name set at present, depressing alphabet keys to enter a user name, and then depressing a register key.

The following advantages result from different user names for personal use of individuals being usable with the facsimile according to the first embodiment.
1) When a cover page is attached to a document for the FAX transmission, the user name can be automatically put on the cover page as an actual transmitting person.
2) Who has used the facsimile can be confirmed by recording individual user names on a communication log.
3) To whom failures, etc. in the FAX transmission are to be informed can be judged by employing individual user names in a communication monitor and communication result report.

Figure 5:
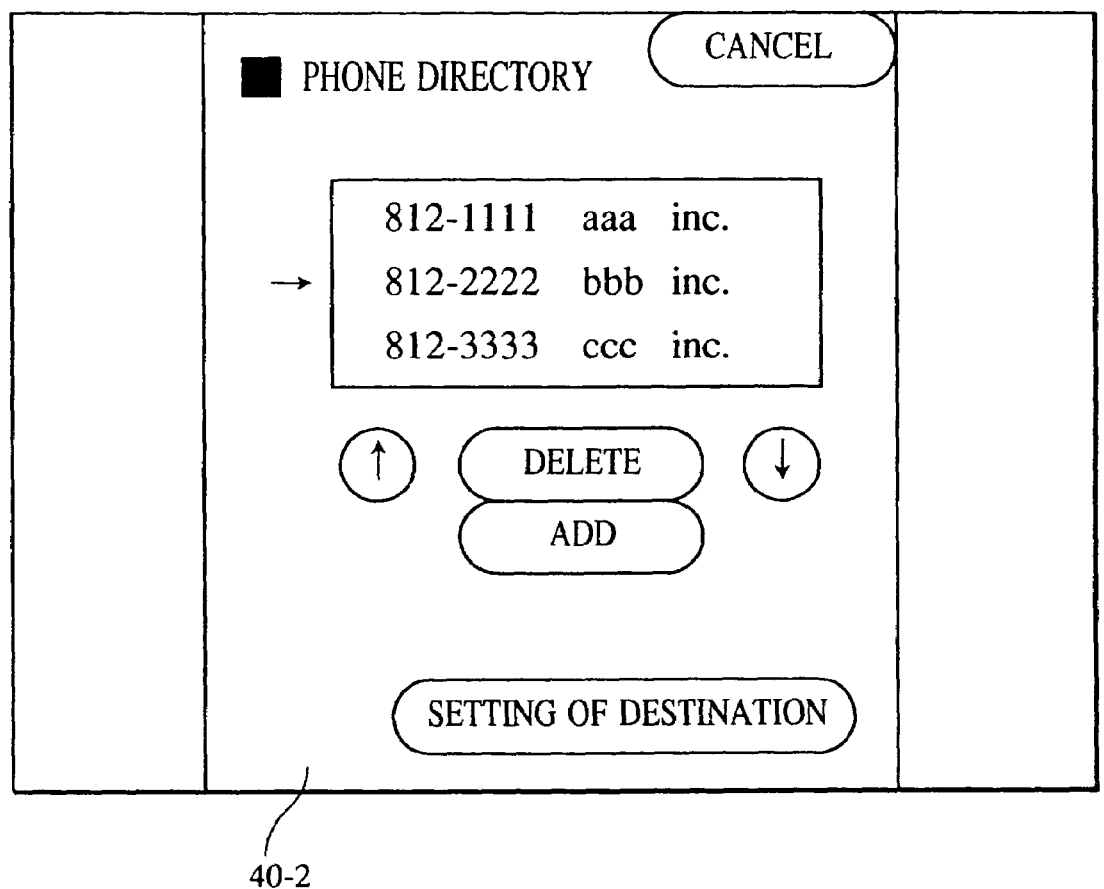
FIG. 5 is a representation showing a phone directory setting screen displayed on the control panel of the facsimile according to the first embodiment of the present invention.

FIG. 5 is a representation showing a phone directory setting screen 40-2 displayed when a phone directory key is depressed. A phone directory is used to store plural phone numbers of the FAX destinations. The phone directory requires more complex operation than the one-touch dial function, but can hold therein more phone numbers.

In the case where the individual setting is not made effective in the facsimile 1 according to the first embodiment, a phone directory common to users and stored in the nonvolatile RAM 20 can be used. In the case where the individual setting is made effective, phone directories for individual users read out of the server 3 can be each used.

Upon the phone directory key being depressed, the phone directory used at that time is displayed in the area 40, as shown in FIG. 5, regardless of whether the individual setting is executed or not. Since phone directory data is displayed in pairs of the phone numbers of the FAX destinations and the destination names, the FAX destination can be set by depressing one of upward and downward headed arrows to scroll the phone directory setting screen 40-2, selecting the desired phone number, and depressing a destination set key. Data of part of the phone directory can be deleted by depressing one of the upward and downward headed arrows, selecting the data to be deleted, and depressing a delete key. When adding data to the phone directory, a similar enter screen as shown in FIG. 4 is displayed upon an add key being depressed. A desired pair of the phone number of the FAX destination and the destination name is entered on the displayed screen. The phone directory setting screen 40-2 can be canceled by depressing a cancel key.

Figure 6:
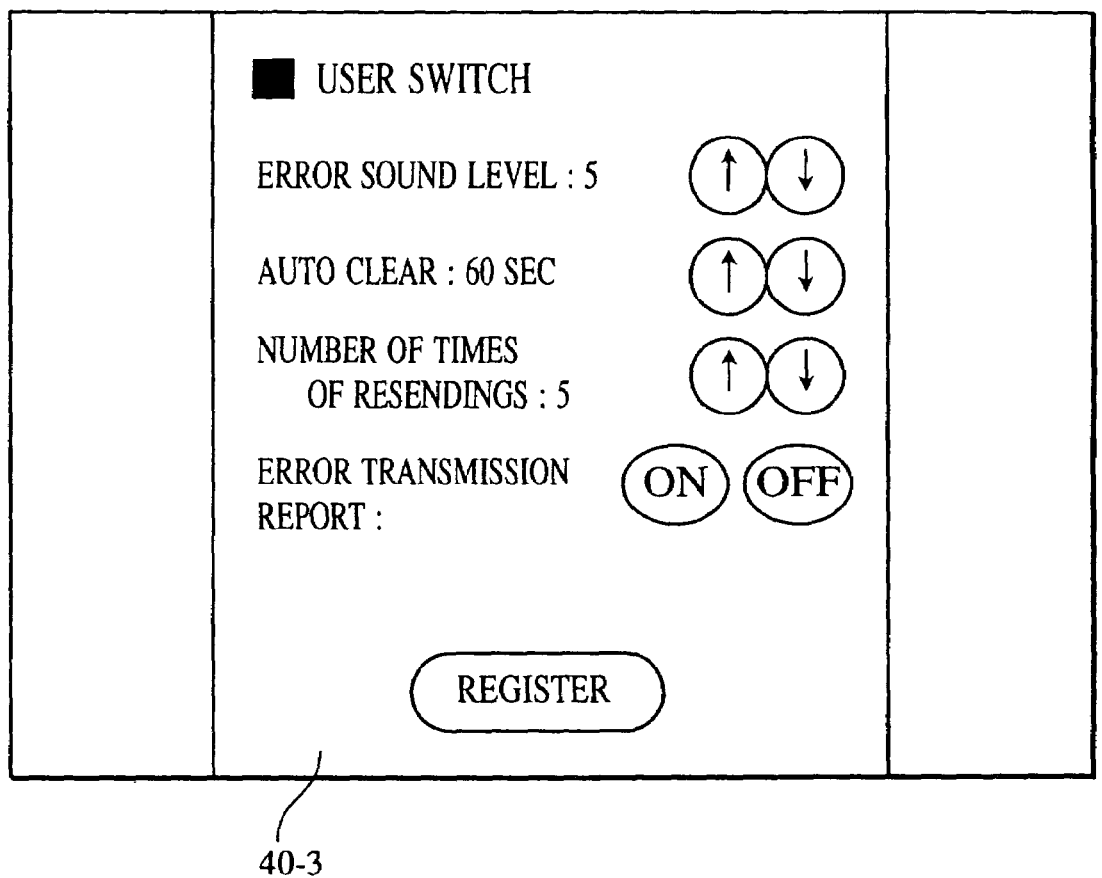
FIG. 6 is a representation showing a user switch setting screen displayed on the control panel of the facsimile according to the first embodiment of the present invention.

FIG. 6 is a representation showing a user switch setting screen 40-3 displayed when a user switch key is depressed. The user switch key is a key which has a function of setting the operation of the facsimile 1, such as settings in usage of the control panel 8 and a coping method to be taken in the event of an error, in accordance with the user's demand.

In the case where the individual setting is not made effective in the facsimile 1 according to the first embodiment, user switch data common to users and read out of the nonvolatile RAM 20 can be used. In the case where the individual setting is made effective, user switch data for individual users read out of the server 3 can be each used.

Upon the user switch key being depressed, the user switch data set at that time is displayed in the area 40, as shown in FIG. 6, regardless of whether the individual setting is executed or not. In the user switch setting screen 40-3, "error sound level" indicates the volume of an alarm sound produced in the event of an error. "Auto clear time" means a time set for returning automatically to the same state as when the reset key is depressed, if no key-in operation is made within the set time after the last key-in operation. "Number of times of resendings" means the number of times designated so as to repeat dialing, for example, when the destination line is busy in the FAX transmission. On/off keys corresponding to "error transmission report" are used for setting whether an error transmission result report is printed or not by the image forming unit 13 in the event of an error during the FAX transmission.

Figure 7:
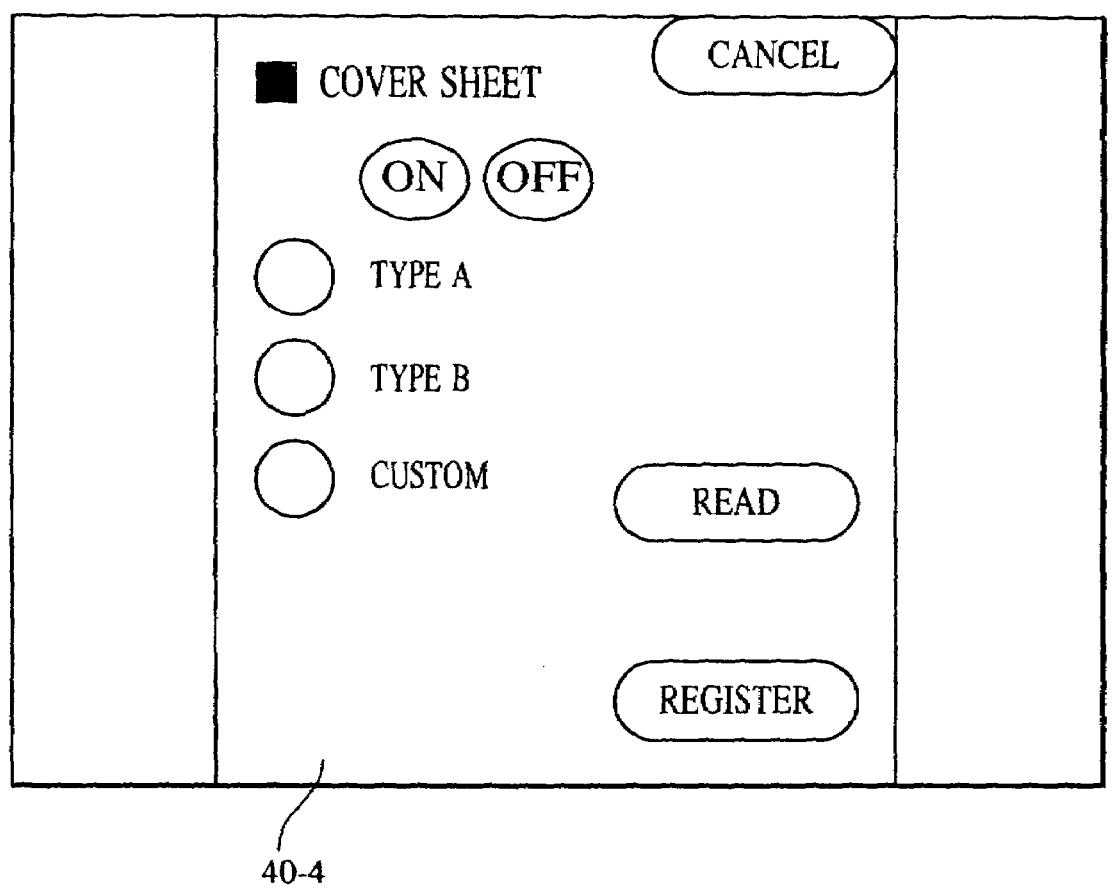
FIG. 7 is a representation showing a cover sheet setting screen displayed on the control panel of the facsimile according to the first embodiment of the present invention.

FIG. 7 is a representation showing a cover sheet setting screen 40-4 displayed when a cover sheet key is depressed. A cover sheet is a sheet attached to a document sent in the FAX transmission, and serves also as a separator between plural sets of received documents on the FAX reception side. Such information as the FAX destination, the FAX source, and the number of pages of the document subjected to the FAX transmission and reception are put on the cover sheet.

In the case where the individual setting is not made effective in the facsimile 1 according to the first embodiment, a cover sheet common to users and read out of the nonvolatile RAM 20 can be used. In the case where the individual setting is made effective, cover sheets for individual users read out of the server 3 can be each used.

Upon the cover sheet key being depressed, cover sheet setting data set at that time is displayed in the area 40, as shown in FIG. 7, regardless of whether the individual setting is executed or not. In the cover sheet setting screen 40-4, on/off keys are used to select whether a cover sheet is attached or not in the FAX transmission. "Type A" and "type B" indicate the types of cover sheets held in the facsimile 1 beforehand, and can be selected by depressing a type A key and a type B key, respectively. A custom key is a key used to a cover sheet specific to the user. A read key is a key used to form a new cover sheet specific to each of individual users. A register key is a key used to register the setting for the cover sheet.

Image data read by depressing the read key after setting a cover sheet specific to the user in the image reading unit 9 is coded through the same route as in the FAX transmission. The coded image data is registered and held as cover sheet data.

Figure 8:
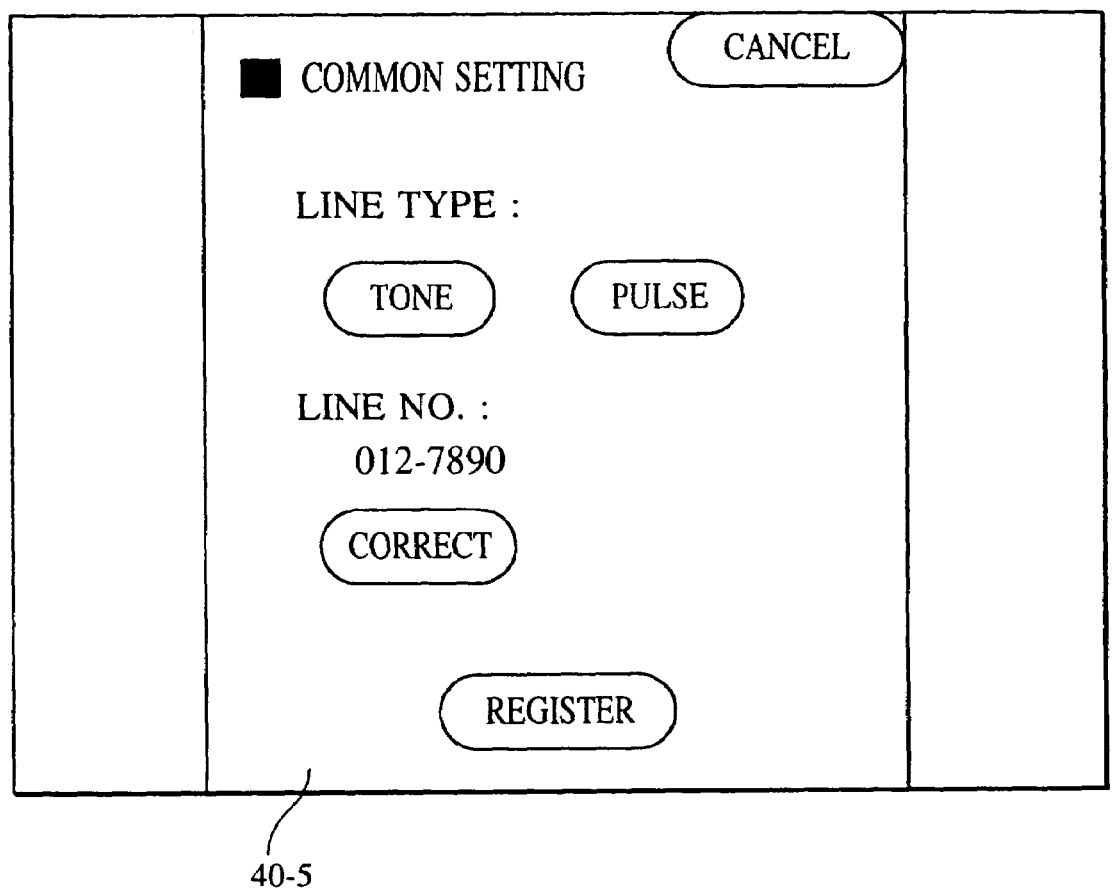
FIG. 8 is a representation showing a common setting screen displayed on the control panel of the facsimile according to the first embodiment of the present invention.

FIG. 8 is a representation showing a common setting screen 40-5 displayed when a common setting key is depressed. Common setting is common to users and hence not subjected to the individual setting in the facsimile 1 according to the first embodiment. When the common setting key is depressed, common setting data set at that time is displayed in the area 40, as shown in FIG. 8.

In the common setting screen 40-5, a tone key and a pulse key ace keys used to select whether dial tones or pulses are issued to the public line in the FAX transmission. That selection is not subjected to the individual setting. "Line No." means the phone number of the facsimile 1 itself, which is informed as the phone number of the FAX source to the FAX destination. That phone number is also not subjected to the individual setting. Incidentally, when the facsimile 1 contains a plurality of public lines (e.g., PSTN and ISDN), that phone number is subjected to the individual setting.

Figure 9:
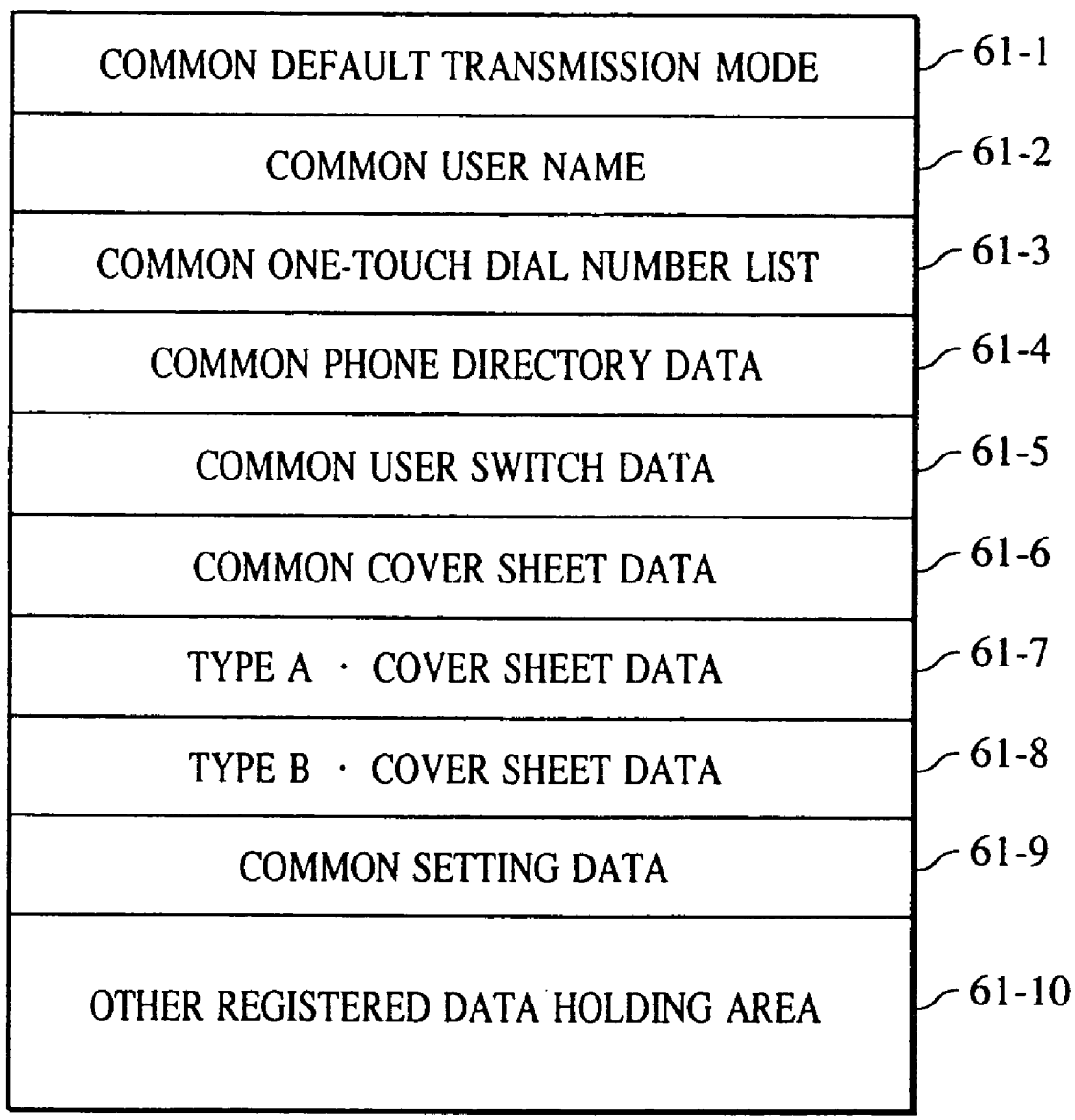
FIG. 9 is a representation showing a situation of data being held in a nonvolatile RAM of the facsimile according to the first embodiment of the present invention.

FIGS. 9 to 13 are representations for explaining various setting data in the facsimile 1. FIG. 9 is a representation showing a situation of data being held in the nonvolatile RAM 20. In the nonvolatile RAM 20, there are allocated a memory area 61-1 for storing the common default transmission mode common to all users, a memory area 61-2 for storing the user name common to all users, a memory area 61-3 for storing the one-touch dial number list common to all users, a memory area 61-4 for storing the phone directory data common to all users, a memory area 61-5 for storing the user switch data common to all users, a memory area 61-6 for storing the cover sheet data common to all users, a memory area 61-7 for storing the type A cover sheet data, a memory area 61-8 for storing the type B cover sheet data, a memory area 61-9 for storing the common setting data, and other registered data holding area 61-10.

Note that since the data stored in the nonvolatile RAM 20 is not erased even after the power supply of the facsimile 1 is turned off, the contents of the associated default data are also not erased.

In the first embodiment, since the common setting data is common to all users and not subjected to the individual setting, they are stored in only the nonvolatile RAM 20. The respective data stored in the memories 61-1 to 61-6 are also common to all users. In the case where the individual setting is not made effective, for example, immediately after the power supply of the facsimile 1 is turned, the respective common data stored in the memory areas 61-1 to 61-6 are copied in memory areas 62-1 to 62-7, described later, and employed as the setting values for all users. In this connection, for example, the contents stored in the memory area 61-1 for storing the common default transmission mode are copied in the memory area 62-1 for storing the current transmission mode and the memory area 62-7 for storing the default transmission mode for each user.

Figure 10:
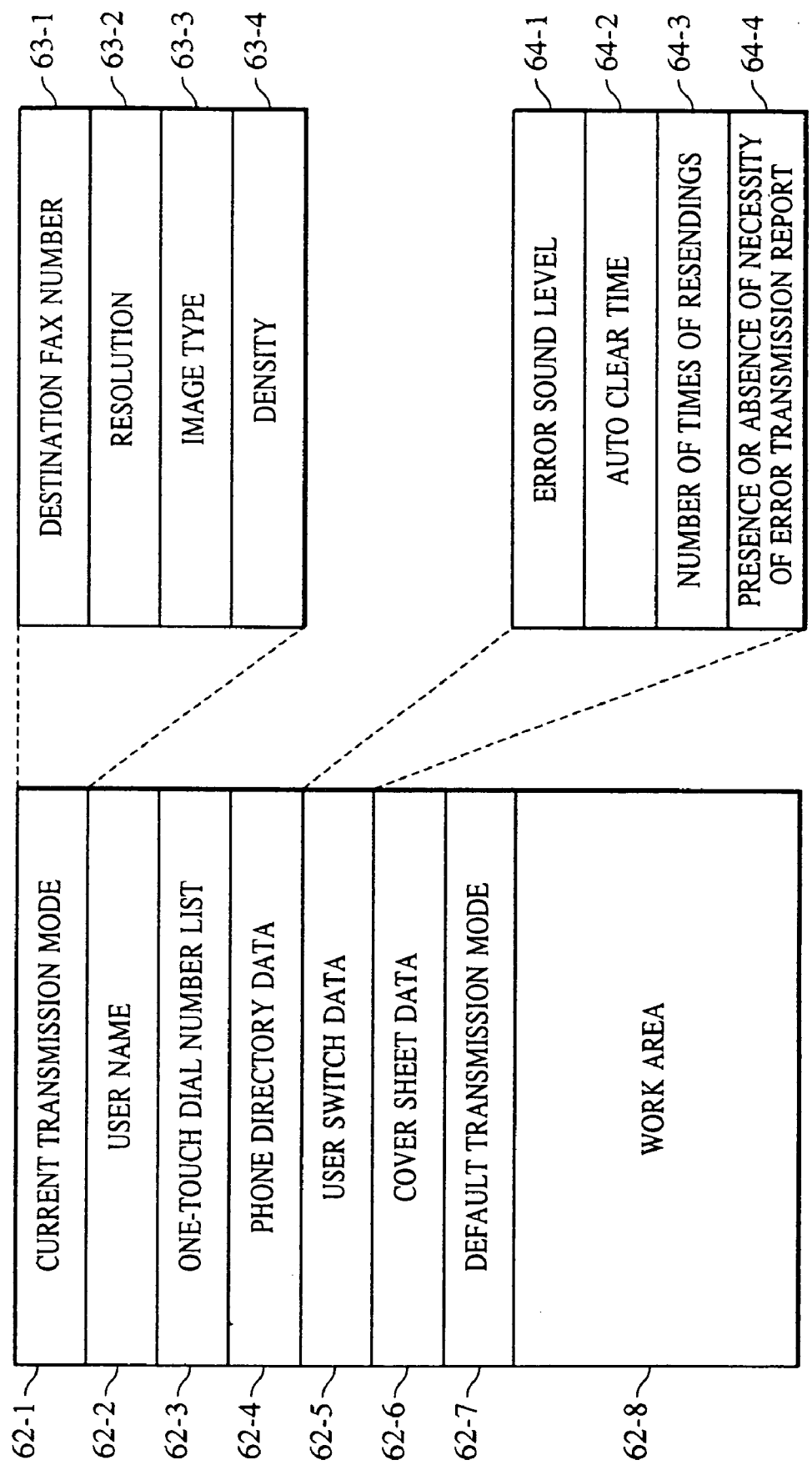
FIG. 10 is a representation showing a situation of data being held in a volatile RAM of the facsimile according to the first embodiment of the present invention, and practical examples of a transmission mode and user switch data.

FIG. 10 is a representation showing a situation of data held in the volatile RAM 19 of the facsimile 1 according to the first embodiment of the present invention, and practical examples of constituent elements of the transmission mode and the user switch data. In the volatile RAM 19, there are allocated a memory area 62-1 for storing the transmission mode currently set in the control panel 8, a memory area 62-2 for storing the currently set user name, a memory area 62-3 for storing the currently set one-touch dial number list, a memory area 62-4 for storing the currently set phone directory data, a memory area 62-5 for storing the currently set user switch data, a memory area 62-6 for storing the currently set cover sheet data, a memory area 62-7 for storing the default transmission mode for each user, and a work area 62-8.

Note that the memory area 62-6 stores therein not only the data indicating which type of cover sheet is being selected, but also image data representing the custom cover sheet data.

The data stored in the volatile RAM 19 is erased when the power supply of the facsimile 1 is turned off. Accordingly, upon power-on of the facsimile 1, respective initial values are set in the memory areas 62-1 to 62-7 of the volatile RAM 19. Specifically, for example, the common default transmission mode stored in the memory area 61-1 of the nonvolatile RAM 20 is copied in the memory area 62-1 for storing the current transmission mode and the memory area 62-7 for storing the default transmission mode. Further, the default user name, the default one-touch dial number list, the default phone directory data, the default user switch data, and the default cover sheet data are also copied in the corresponding memory areas.

The data stored in the memory areas 62-1 to 62-7 can be subjected to the individual setting for each user. When the individual setting is made effective, the data stored in the memory areas 62-1 to 62-7 is replaced by the data for each user. When the individual setting is made ineffective, the data stored in the memory areas 62-1 to 62-7 is replaced by the default data stored in the nonvolatile RAM 20 for initialization as when the power supply of the facsimile 1 is turned on.

The transmission mode is made up of the destination FAX number 63-1, resolution 63-2, image type 63-3 and density 63-4. The user switch data is made up of an error sound level 64-1, auto clear time 64-2, number of times of resendings 64-2, and data 64-4 indicating the presence or absence of necessity of an error transmission report.

In the above configuration, when registering the default transmission mode, the contents stored in the memory area 62-1 for storing the current transmission mode are copied, as they are, in the memory area 62-7 for storing the default transmission mode. Also, when registering the default transmission mode in a state where the individual setting is not made effective, the contents stored in the memory area 62-1 for storing the current transmission mode are copied, as they are, in the memory area 61-1 for storing the common default transmission mode. On the other hand, when the default transmission mode is called upon, e.g., the reset key being depressed, the contents stored in the memory area 62-7 for storing the default transmission mode are copied in the memory area 62-1 for storing the current transmission mode.

Further, in the above configuration, when the setting of the auxiliary function such as the user name, for example, is changed, the contents stored in the memory area 62-2 for storing the user name for each user are rewritten. When the setting of the auxiliary function such as the user name, for example, is changed in the state where the individual setting is not made effective, the contents stored in the memory area 61-2 for storing the common user name common to all users are rewritten.

Figure 11:
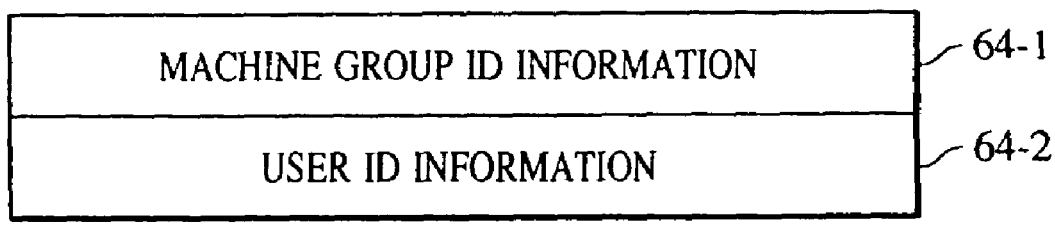
FIGS. 11 to 13 are representations showing individual setting information in the facsimile according to the first embodiment of the present invention.
Figure 12:
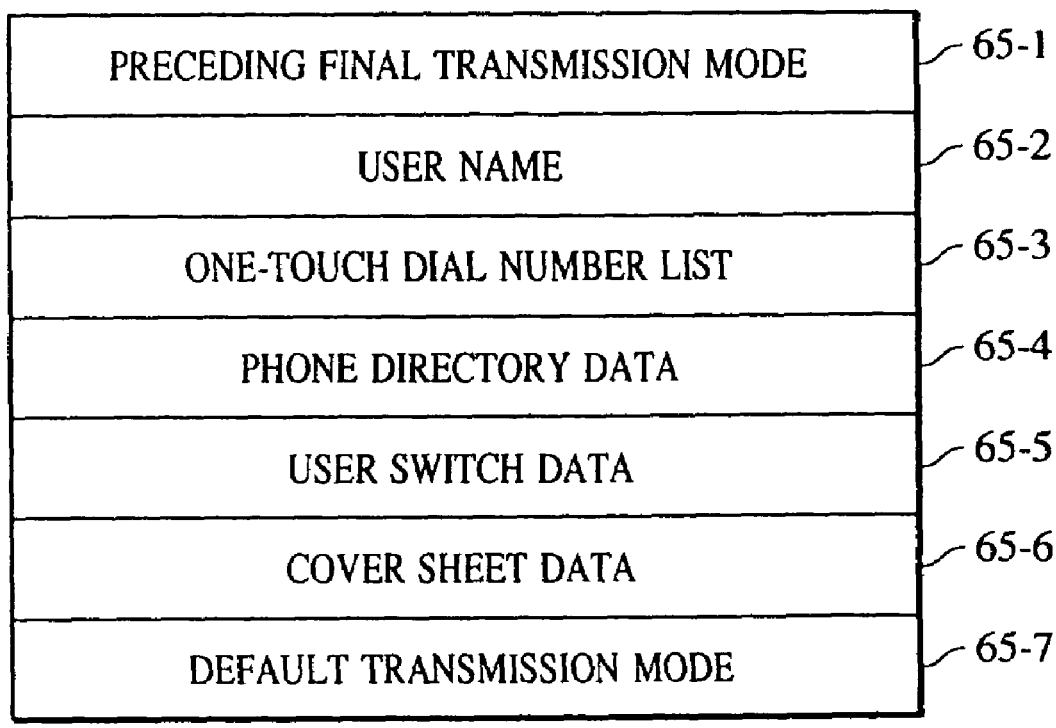

FIGS. 11 and 12 are representations showing individual setting information in the facsimile according to the first embodiment. When the individualize key 51 is depressed with the ID card 41 kept inserted in the ID card reader 21 of the control panel 8, both machine group ID information 64-1 and user ID information 64-2 shown in FIG. 11 are transmitted from the facsimile 1 to the server 3.

The machine group ID information is information for identifying different types of machine groups to be, e.g., 1 for copying machines, 2 for facsimiles, and 3 for printers. The same machine group implies that the individual setting information is compatible within the group. The user ID information is information for identifying individual users. The information is given as, e.g., 00001 for a user A and 00002 for a user B. Additionally, the machine group ID information may also contain information for indicating the machine model and information for indicating the version.

Upon receiving the machine group ID information 64-1 and the user ID information 64-2 from the facsimile 1, the server 3 transmits the individual setting information (see FIG. 12) stored for each machine group and for each user back to the facsimile 1. The individual setting information is information indicating the final state of the control panel 8 in the preceding operation made by the user of the facsimile 1, and is made up of, as shown in FIG. 12, a preceding final transmission mode 65-1, user name 65-2, one-touch dial number list 65-3, phone directory data 65-4, user switch data 65-5, cover sheet data 65-6, and default transmission mode 65-7.

In the facsimile 1, the individual setting information transmitted from the server 3 is copied in the memory areas 62-1 to 62-7 of the volatile RAM 19, whereby the individual setting is realized.

Figure 13:
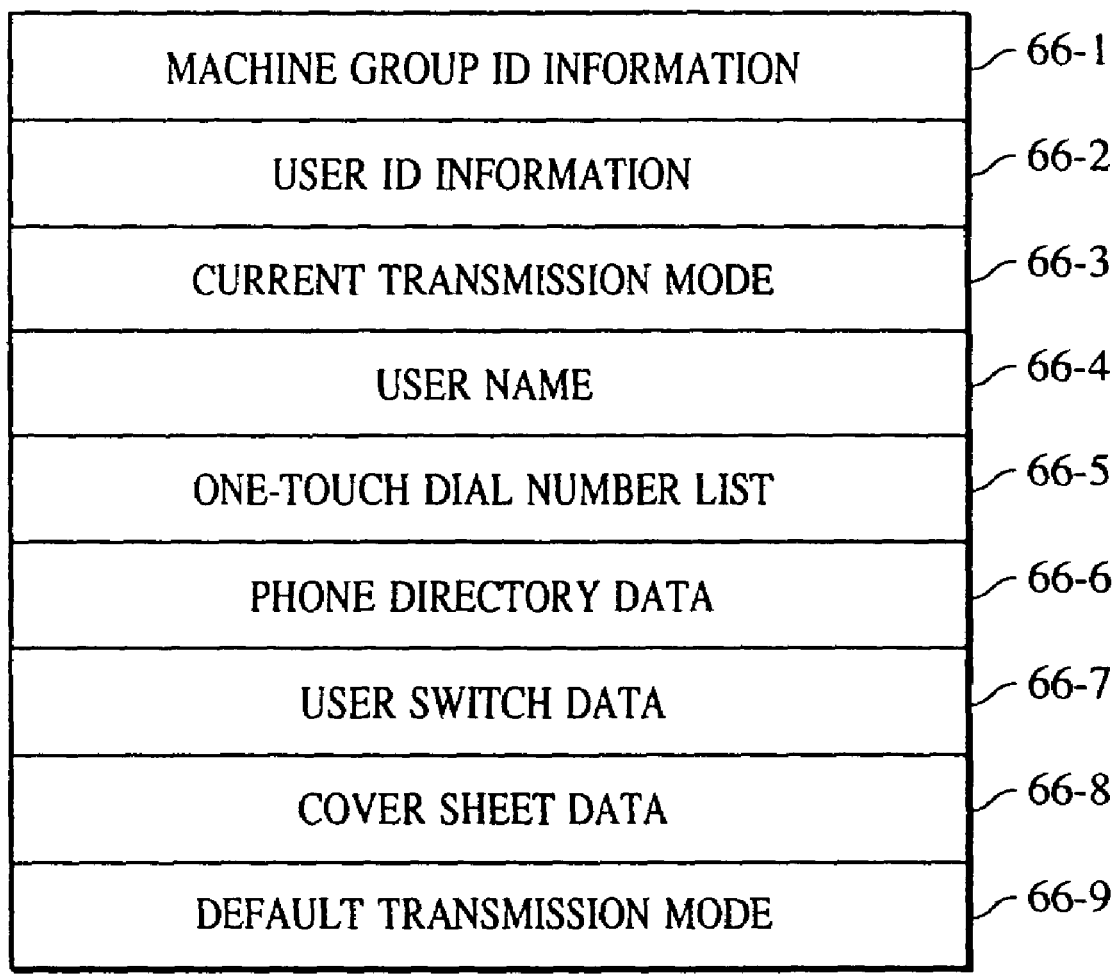

When the ID card 41 is withdrawn out of the ID card reader 21 after the individual setting has been made on the control panel 8, machine group ID information 66-1, user ID information 66-2, and the individual setting information at that time (including current transmission mode 66-3, user name 66-4, one-touch dial number list 66-5, phone directory data 66-6, user switch data 66-7, cover sheet data 66-8, and default transmission mode 66-9) are transmitted from the facsimile 1 to the server 3, as shown in FIG. 13.

Upon receiving those individual setting information from the facsimile 1, the server 3 rewrites and updates the individual setting information stored therein for each machine group and for each user.

By transmitting and receiving the individual setting information along with the machine group ID information and managing the individual setting information for each machine group, as explained above, it is possible to employ a common server for storing the individual setting information by copying machines, facsimiles and printers, and further take out the individual setting information specific to each machine group.

Also, as explained above, the final transmission mode of the facsimile 1 in the preceding operation is transmitted to and stored in the server, and when the facsimile 1 is next operated by the same user, that transmission mode is called from the server 3 upon entry of the user ID. This enables each user to continue the operation of the preceding FAX transmission. Accordingly, the facsimile 1 allowing the so-called resume function to be utilized by a plurality of users in common can be achieved. In addition, the resume function in this embodiment is featured in that each user can continue the preceding transmitting operation even in another facsimile different from the facsimile 1 which was employed for the preceding transmitting operation.

Figure 14:
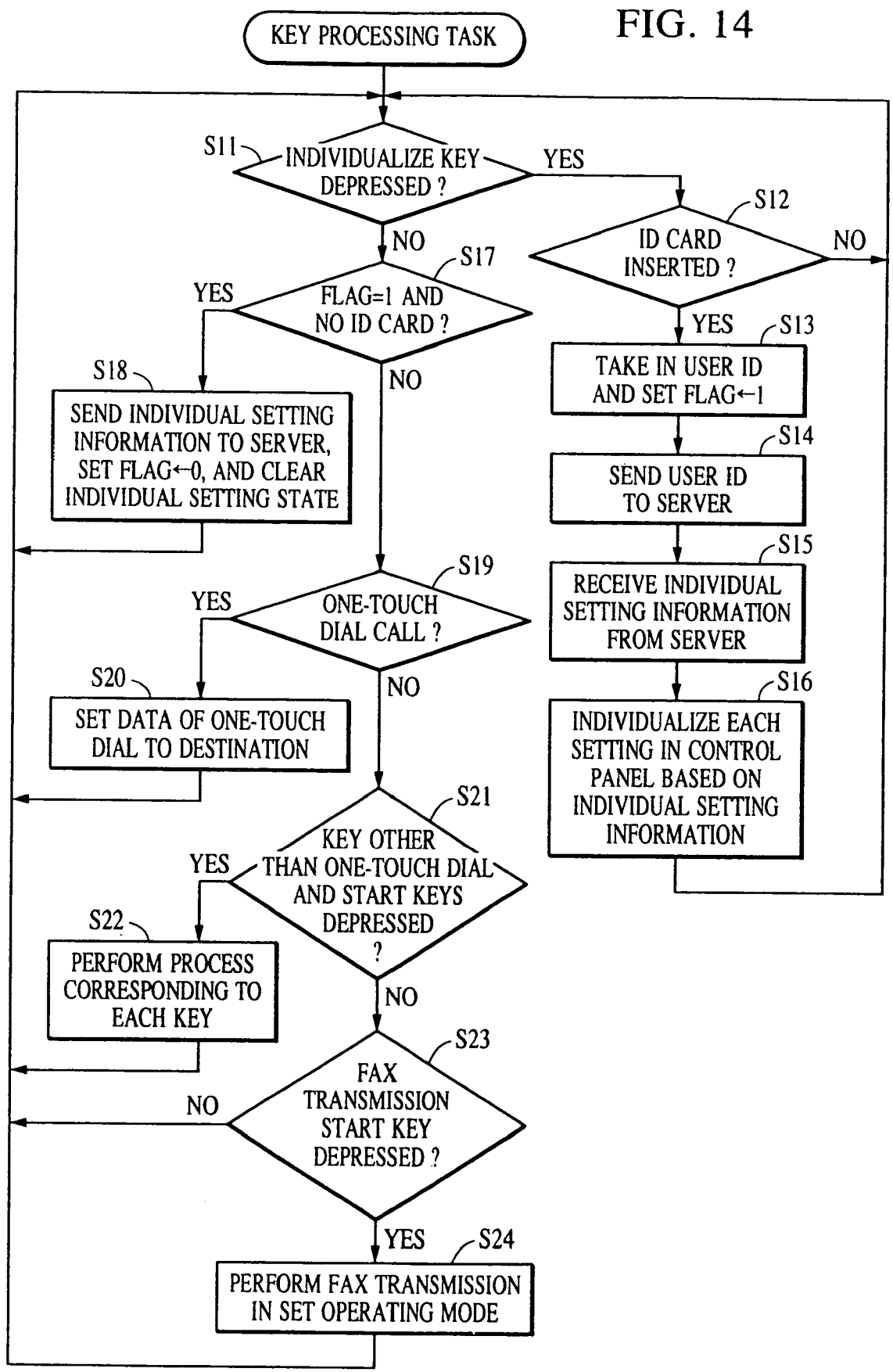
FIG. 14 is a flowchart for explaining a key processing task in the facsimile according to the first embodiment of the present invention.

FIG. 14 is a flowchart for explaining a key processing task in the facsimile 1 according to the first embodiment of the present invention. In step S11, it is checked whether the individualize key is depressed or not. If the individualize key is depressed, the process flow goes to step S12 to determine whether the ID card 41 is inserted in the ID card reader 21. If the ID card is not inserted, the process flow goes back to step S11. On the other hand, if the ID card is inserted, the process flow goes to step S13 where user ID information is taken out of the ID card 41 and a flag indicating that the user ID has been taken in is set to 1.

In step S14, as explained above in connection with FIG. 11, the machine group ID and the user ID are transmitted to the server 3 to request the individual setting information corresponding to the machine group and the user. In step S15, as explained above in connection with FIG. 12, the facsimile 1 receives the individual setting information from the server 3 in response to the request. In step S16, the received individual setting information is written in the memory areas 62-1 to 62-7 of the volatile RAM 19 shown in FIG. 10 so-that the setting information is individualized or individually set in the control panel 8 for the user corresponding to the user ID.

If the individualize key is not depressed in step S11, the process flow goes to step S17 to determine whether the flag is set to 1 or not and whether the ID card 41 is removed out or not. In other words, it is determined in step S17 whether the ID card 41 is removed out or not after carrying out the individual setting. If the flag is set to 1 and the ID card 41 is removed, this means the end of the operation. In step S18, therefore, the machine group ID, the user ID and the latest individual setting information are transmitted to the server 3 to update the individual setting information, as explained above in connection with FIG. 13. Further, the flag is reset to 0 and the contents stored in the memory areas 61-1 to 61-6 of the nonvolatile RAM 20 for storing the respective default data are copied in the memory areas 62-1 to 62-7 of the volatile RAM 19, followed by clearing the individual setting state.

If the flag is not set to 1 or the ID card 41 is not removed in step S17, the process flow goes to step S19 to determine whether any one of the one-touch dial calling keys, i.e., M1 to M8 keys, is depressed or not. If any one of the one-touch dial calling keys is depressed, the process flow goes to step S20 where the data stored corresponding to the depressed one-touch dial calling key is copied to the destination FAX number 63-1 in the memory area 62-1 for storing the current transmission mode and is displayed in the area 44.

If no one-touch dial calling key is depressed in step S19, the process flow goes to step S21 to determine whether any other key than the one-touch dial calling keys and the FAX transmission start key is depressed or not. If any other key is depressed, the process flow goes to step S22 in which the process corresponding to the depressed key is carried out.

In step S23, it is determined whether the FAX transmission start key is depressed or not. If the FAX transmission start key is depressed, the process flow goes to step S24 to start the FAX transmission in accordance with the transmission mode set at the present.

In the first embodiment, the individual setting is made effective when the individualize key is depressed after the ID card 41 has been inserted. Alternatively, the individual setting may be made effective upon the ID card 41 being inserted regardless of whether the individualize key is depressed or not. The former case is advantageous in that the individual setting can be made effective at any desired point in time, whereas the latter case is advantageous in that the user is not required to depress the individualize key.

Furthermore, in the first embodiment, when the individualize key is depressed, all items of the individual setting information are taken out of the server 3 to effect the individual setting, and when the ID card 41 is removed out, all items of the individual setting information are transmitted to the server 3 for updating the individual setting information. It is however also possible to perform the individual setting partly only when required, and to update the individual setting partly only when required. This is advantageous in that a communication time between the facsimile 1 and the server 3 can be reduced since the individual setting information is partly transmitted and received only when required.

Particularly, in the case of handling a large amount of data as with, for example, the first embodiment wherein image data such as the cover sheet data is subjected to the individual setting, there can be such an advantage as that the processing time is cut down by omitting the useless individual setting and not updating the useless part of the individual setting information. More specifically, it is usual that the cover sheet data is not transmitted and received as the individual setting information, and the custom cover sheet data is received from the server 3 only when the setting to attach a custom cover sheet is instructed and the FAX transmission is instructed. Also, only when a custom cover sheet is registered is the custom cover sheet data transmitted to the server 3 for updating.

Moreover, while in the first embodiment a copy of all items of the individual setting information stored in the server 3 is held in each facsimile, only part of the copy of all items of the individual setting information may be held on the facsimile side, or such a copy may not be held at all. In the former case, for example, only part of the phone directory data shown in FIG. 5, which is to be displayed, is received from the server 3 and held in the facsimile each time the occasion requires. When the screen is scrolled, the next phone directory data is transmitted from the server 3 for each scrolling stroke. A large amount of phone directory data can also be handled in such a manner. Stated otherwise, a large amount of phone directory data is required to be stored in only the server 3, and each facsimile can receive only a required part of the phone directory data when required, without being restricted in memory capacity thereof. In the latter case, the copy of the individual setting information is not held in a memory of each facsimile and is taken in from the server 3, whereas the individual setting information stored in the server 3 is updated each time the individual setting information is updated.

While in the first embodiment the contents of the final setting are transmitted back to the server 3, the setting may be performed with data which is temporarily different from the usual. In such a case, an instruction is entered from the control panel 8 so that those data are not transmitted back to the server 3.

[Embodiment 2]

The second embodiment of the present invention differs from the first embodiment in a manner of transmitting a read image, a manner of connection to the network, the number of servers for storing the individual setting information, a manner of identifying ID, a manner of registering the individual setting information, individual setting items, and so on. However, the second embodiment operates and executes processing basically similarly to the second embodiment in other points.

Figure 15:
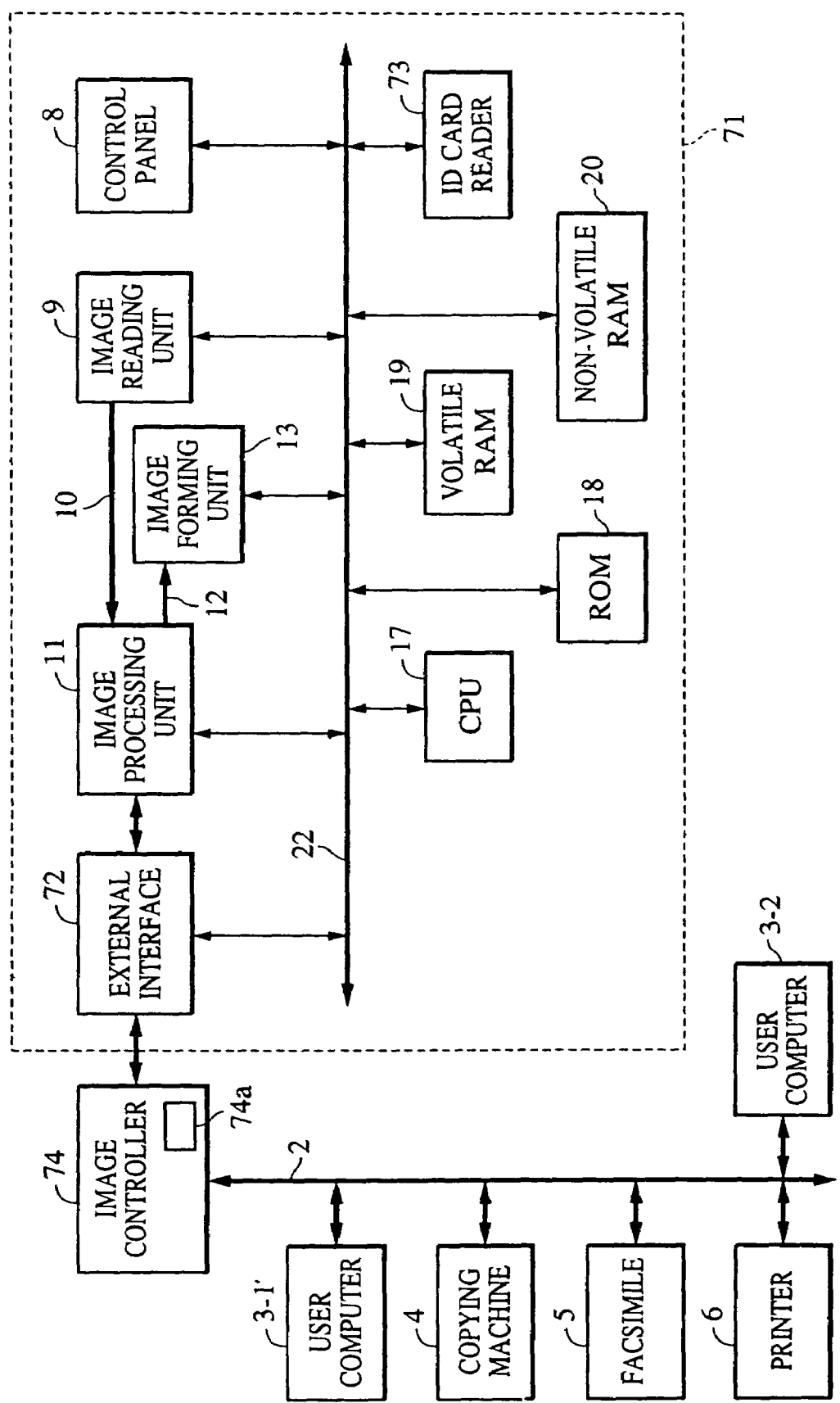
FIG. 15 is a block diagram showing the configuration of a color copying machine according to a second embodiment of the present invention.

FIG. 15 is a block diagram showing the configuration of a color copying machine according to a second embodiment of the present invention. The color copying machine of the second embodiment will be described below.

As shown in FIG. 15, a color copying machine 71 according to the second embodiment of the present invention comprises an external interface 72, a control panel 8, an image reading unit 9, an image processing unit 11, an image forming unit 13, a CPU 17, a ROM 18, a volatile RAM 19, a nonvolatile RAM 20, an ID card reader 73, and a CPU bus 22, these components being connected to the CPU bus 22.

In the second embodiment, the color copying machine 71 is connected a network 2 through an image controller 74. The image controller 74 has an image memory 74*a* stores color image data read out of the color copying machine 71 in the image controller 74. The image controller 74 has functions of transmitting an image data to respective user computers (computer terminals employed by users) 3-1, 3-2 via the network 2, receiving image data from the user computers 3-1, 3-2 via the network 2, storing the received image data in the image memory 74*a*, and then outputting the stored image data to the color copying machine 71 to print a color image.

This second embodiment having the configuration explained above is advantageous in that a network connecting portion can serve in versatile ways by connecting the color copying machine 71 to the network 2 through the image controller 74 to transmit and receive the individual setting information rather than directly connecting the color copying machine 71 to the network 2 to transmit and receive the individual setting information. The user ID information for the individual setting, the machine information, and the individual setting information are transmitted and received between the color copying machine 71 and the computer terminal for each user through the image controller 74. Thus, in the second embodiment, an access is made to the computer terminal connected to the network through the image controller 74 and so on.

Image data 10 read by the image reading unit 9 is subjected to a resolution converting process and other processes in the image processing unit 11, and is output as raster image data to the image controller 74 through the external interface 72. The image data output from the color copying machine 71 is first written in the image memory 74*a* of the image controller 74. After that, the image data read out of the image memory 74*a* is converted into a format adapted for an external machine as the destination, and then transmitted to the user computers 3-1, 3-2, etc. via the network 2.

On the other hand, the destination may be a facsimile 5 capable of receiving facsimile data via the network 2. In this case, data adapted for facsimile is formed by coding performed with, e.g., the ME method, in the image controller 74 and then transmitted to the facsimile 5 via the network 2.

Further, the second embodiment include a plurality of computer terminals which correspond to servers for storing the individual setting information. More specifically, the individual setting information is taken in for one user through the user computer 3-1 and for another user through the user computer 3-2. Information indicating from which computer terminal the individual setting information is to be taken in is acquired as part of the user ID information stored in an ID card. As an alternative, for example, the user ID information may be broadcast to each machine connected to the network, and the computer terminal which holds the individual setting information corresponding to the user ID information may responsively transmit back the individual setting information.

Also, each of the personal computers connected to the network 2 has its own network address which is contained as part of the user ID information stored in an ID card. Accordingly, in the case where the individual setting is made effective, a command for requesting transfer of the individual setting information is sent to the personal computer which has the network address read out of the ID card, and the requested personal computer responsively transmits the individual setting information. The first embodiment is advantageous in that the individual setting information can be controlled in a centralized fashion and a server storing all of the individual setting information always exists, while the second embodiment is advantageous in that a specific server storing all of the individual setting information is not necessarily required and each user can edit the individual setting information with his own personal computer.

Incidentally, a computer terminal which is the destination of a read image for one user and a computer terminal which stores the individual setting information for the same user may be the same computer or separate computers.

In the second embodiment, the ID card reader 73 is a non-contact type card reader. Recently, a non-contact type ID card reader utilizing electric waves is beginning to be employed for, e.g., identifying a passerby in control of opening and closing office doors. Also, research of such a non-contact type ID card reader has been progressed in application to automatic ticket gates of trams or the like. A non-contact type ID card reader can be relatively simply realized by, for example, constructing an ID card from a battery-incorporated IC card and generating electric waves from the IC card side. Note that an IC card may have any other suitable form so long as ID information can be acquired in a non-contact manner.

The first embodiment has an advantage that the contents of a user ID card can be surely identified and the ID information can be taken in with certainty upon the ID card being inserted. On the other hand, the second embodiment has an advantage that the ID information can be taken in just by a user standing in front of the color copying machine 71 with the ID card kept on the user's body without requiring the user to insert the ID card in the ID card reader.

Figure 16:
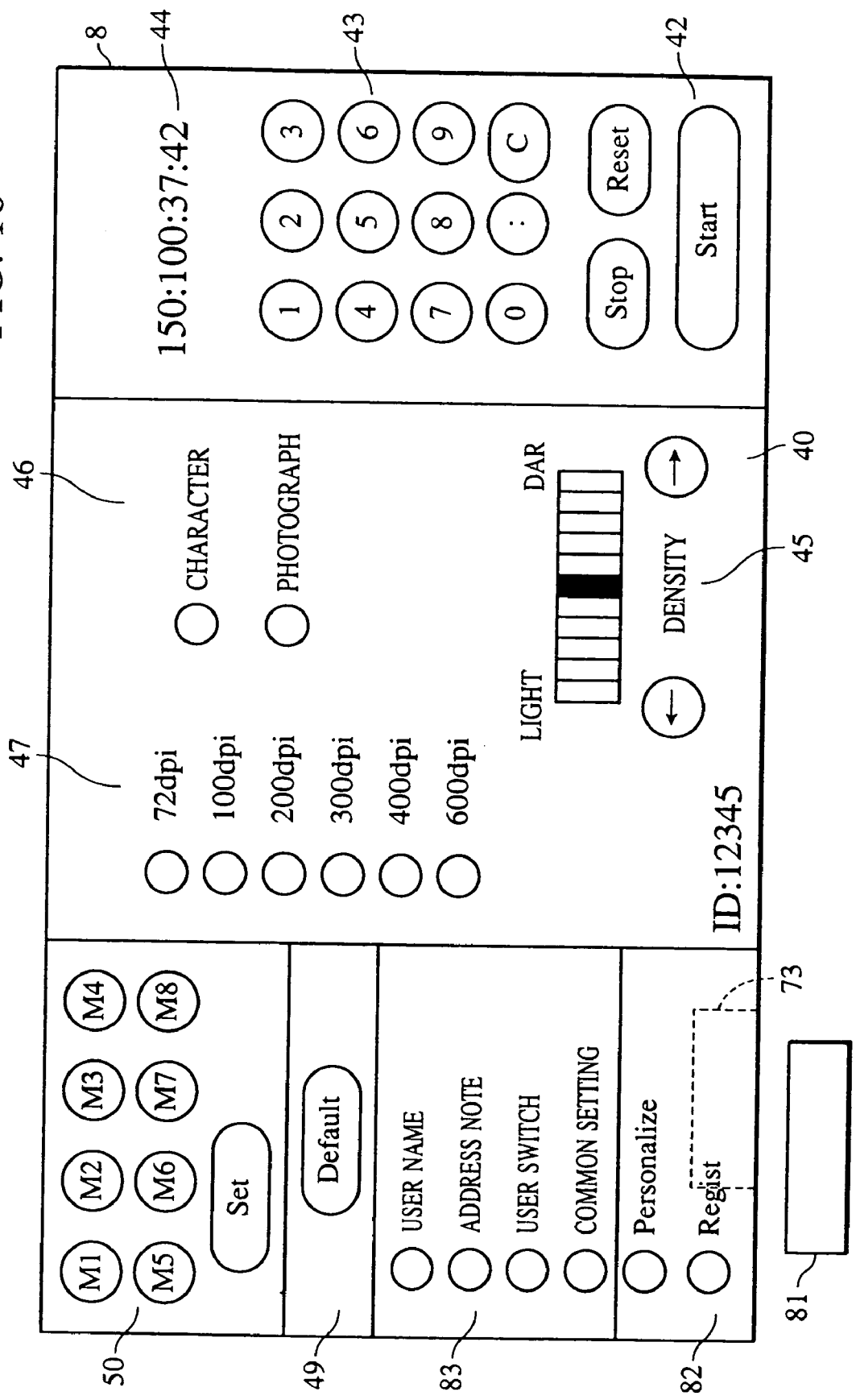
FIG. 16 is a representation showing the arrangement of keys and a display on a control panel of the color copying machine according to the second embodiment of the present invention.

FIG. 16 is a representation showing the arrangement of keys and a display on the control panel 8 of the color copying machine 71 according to the second embodiment of the present invention. The non-contact type card reader 73 is provided in a lower portion of the control panel 8 and takes in ID information from an ID card 81 in a non-contact manner.

In the first embodiment, at the time the ID card is withdrawn, the individual setting information stored in the server is updated. On the other hand, in the second embodiment, the individual setting information stored in the server is updated at the time a register key provided in an area 82 of the control panel 8 is depressed explicitly. Thus, the first embodiment has an advantage that the individual setting information is automatically updated without a key-in operation, whereas the second embodiment has an advantage that the individual setting information can be kept from being updated if it is desired.

Further, in the second embodiment, the recognized user ID information is displayed in a lower left portion of the area 40 so that the user can confirm whether the recognized result is right or not. While there is no possibility of erroneous recognition in the first embodiment because an insertion type ID card is employed, there is a possibility in the second embodiment using a non-contact type ID card that the individual setting may be performed in accordance with false ID information taken in by the IC card reader responding to another ID card of a passerby or the like different from the user who is going to employ the color copying machine 71. To avoid such erroneous recognition, it is important in the second embodiment that the user can confirm the ID information.

Moreover, while in the first embodiment the phone number is designated as the FAX destination of the read image, the network address of the destination is designated in the second embodiment. The network address is entered through numeral ten keys provided in the area 43 and displayed in the area 44. Additionally, FIG. 16 is illustrated as being able to enter only one destination address. However, the color copying machine 71 in the second embodiment can transmit the read image to a plurality of machines at the same time, and to that end, it is designed to be capable of setting a plurality of destination network addresses. In addition, one-touch dial calling keys provided in the area 50 are used to store not the destination FAX number, but rather the destination network addresses. Note that transmission through a network is not directly concerned with "dialing", but "dial" represents a close concept in designating the destination and hence the term "one-touch dial" is also used here.

While in the first embodiment the resolution is selected from three steps of "standard", "fine" and "superfine" (in units of mm), the resolution is selected in the second embodiment from six numerical values, i.e., 72 dpi (dot per inch), 100 dpi, 200 dpi, 300 dpi, 400 dpi and 600 dpi (in inch units), as shown in the area 47. Although resolution standards in facsimiles are determined and a selectable range of parameters can be restricted, the color copying machine of the second embodiment has no limitation in how the image data read and transmitted to the user computer is employed. For this reason, as needed in the second embodiment various items can be designated in detail. In FIG. 16, for simplicity of the explanation, only character/photograph image modes, density of a transmitted image, and resolution thereof are shown as parameters capable of being designated in reading the image similarly to the first embodiment. In addition to those parameters, other parameters below may also be selectable and subjected to the individual setting; 1) color/monochrome switching, 2) color system in color printing (e.g., RGB/Lab switching), 3) the number of bits per pixel and switching between multi-value reading and binary reading), 4) processing such as trimming and masking, 5) designation of format of a transmitted image, 6) designation of a compressing method in the case of image compression, 7) designation of an image name, etc.

Additionally, in the second embodiment, the information displayed on the control panel 8 and the items selectable on it can also be individualized in setting.

Figure 17:
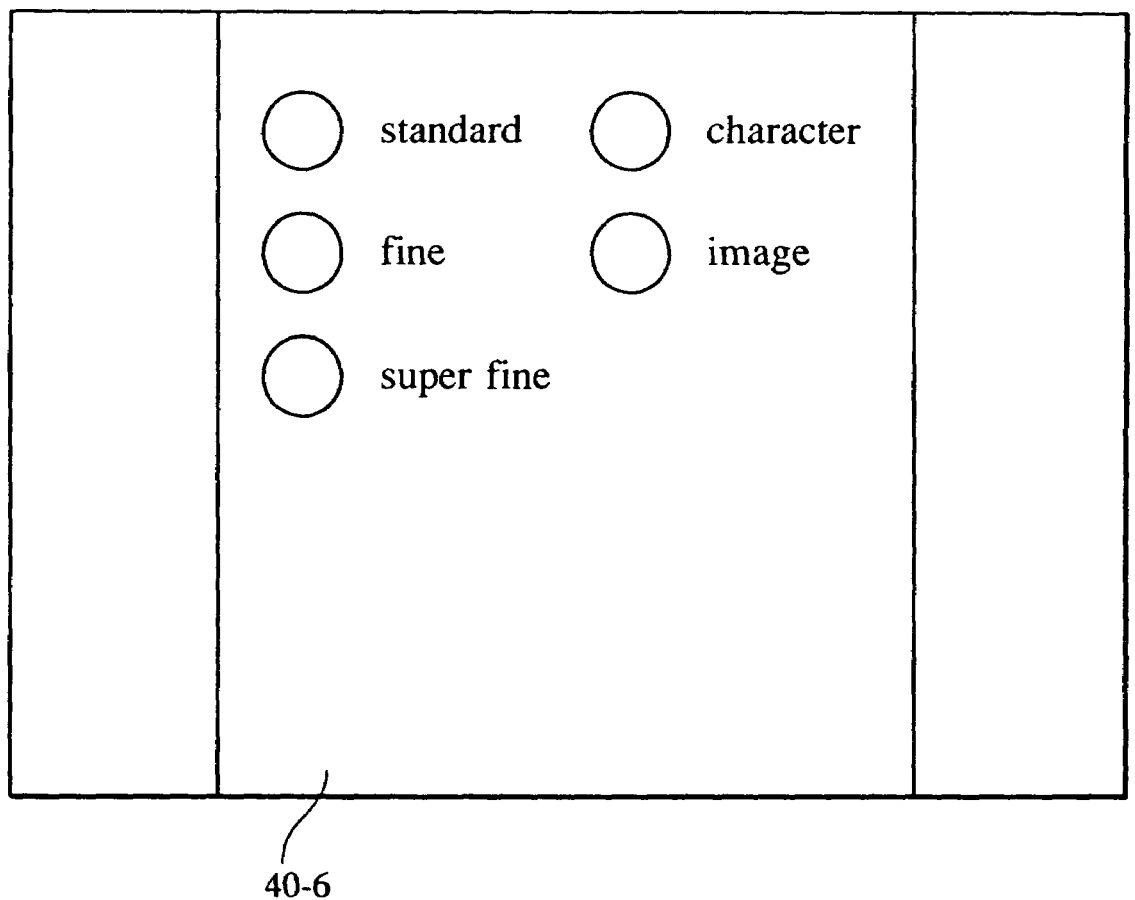
FIG. 17 is a representation showing a simplified standard screen displayed on the control panel of the color copying machine according to the second embodiment of the present invention.

FIG. 17 is a representation showing a standard screen 40-6 simplified for beginner-level users and displayed on the control panel 8 of the color copying machine 71 according to the second embodiment of the present invention. FIG. 17 shows only the areas 46 and 47 extracted from the screen shown in FIG. 16. On the screen of FIG. 16, users can designate the resolution by selecting one of six-step numerals. Such a screen for designating the resolution is convenient for higher-class users, but it is difficult for beginner-level users to understand the meaning of the numerals put on the screen; hence the six-step numerals are not often necessary for them. In the screen for beginner-level users, therefore, it is preferable that the resolution be displayed in more simplified form in three steps each given a corresponding name, as shown in FIG. 17, allowing those users to select one of the three-step resolution values. Whether to display the screen shown in FIG. 16 or the screen shown in FIG. 17 is individually set depending on a level of each user.

Figure 18:
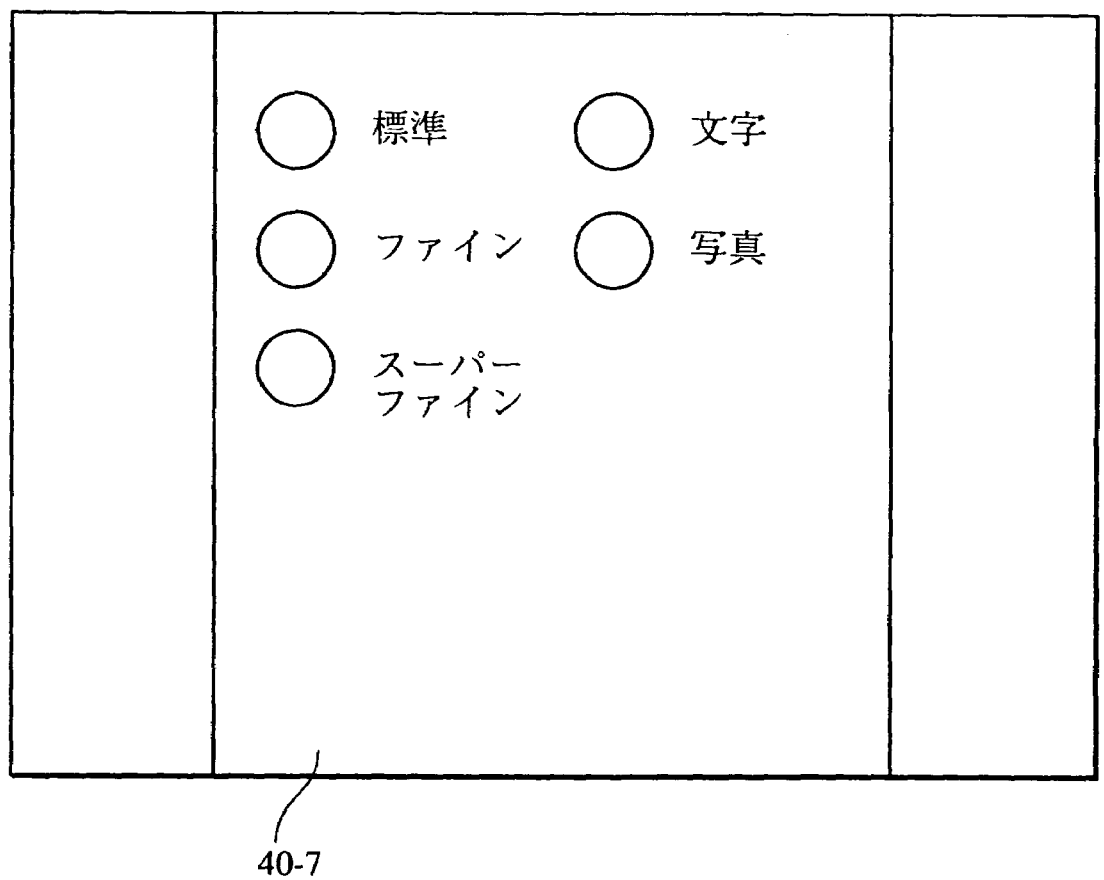
FIG. 18 is a representation showing a standard screen in Japanese displayed on the control panel of the color copying machine according to the second embodiment of the present invention.

FIG. 18 is a representation showing a standard screen 40-7 in Japanese for Japanese zone users which corresponds to the standard screen 40-6 of FIG. 17. In the color copying machine of the second embodiment, the displayed language is automatically individually set in accordance with designation of the displayed language made by each user.

Figure 19:
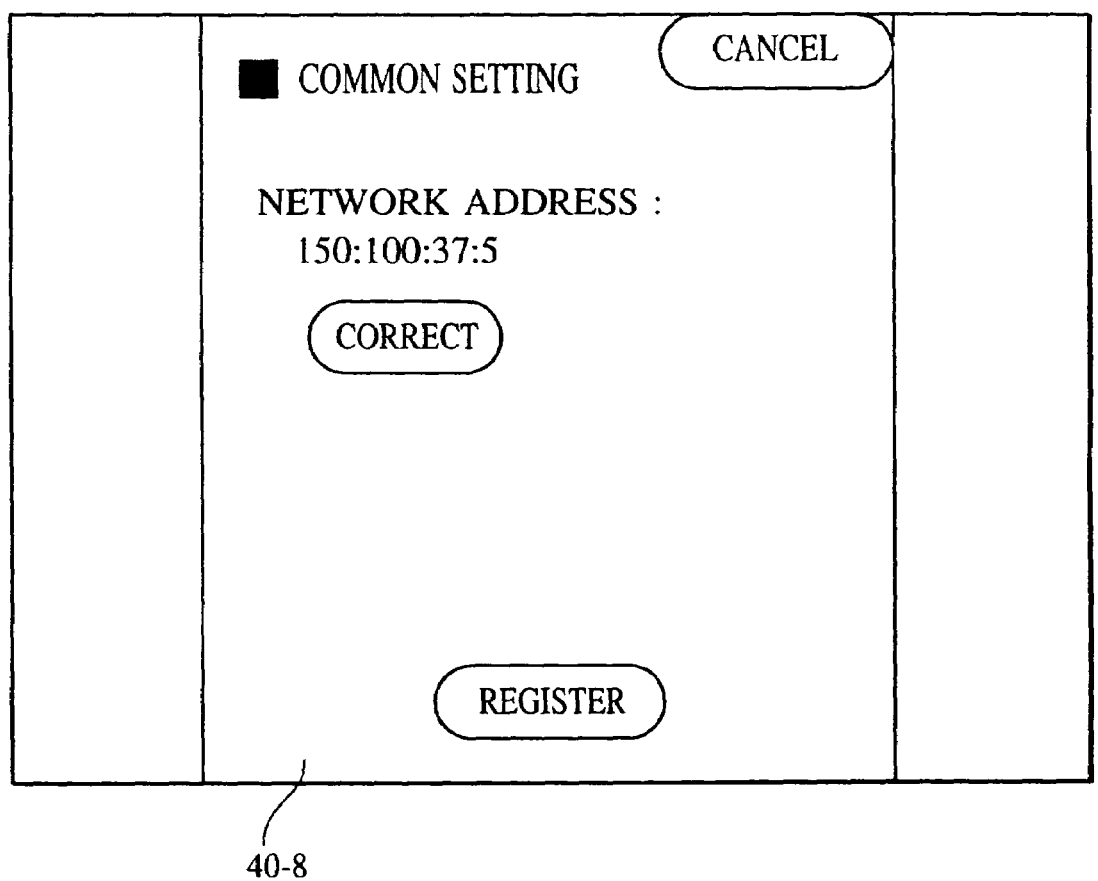
FIG. 19 is a representation showing a common setting screen displayed on the control panel of the color copying machine according to the second embodiment of the present invention.

FIG. 19 is a representation showing a common setting screen 40-8 displayed when the common setting key in the area 83 shown in FIG. 16 is depressed. While the destination phone number is registered in the first embodiment, the destination network address is registered in the second embodiment as shown in FIG. 19. Note that network addresses are allocated to color copying machines in one-to-one relation and therefore are not subjected to the individual setting.

Figure 20:
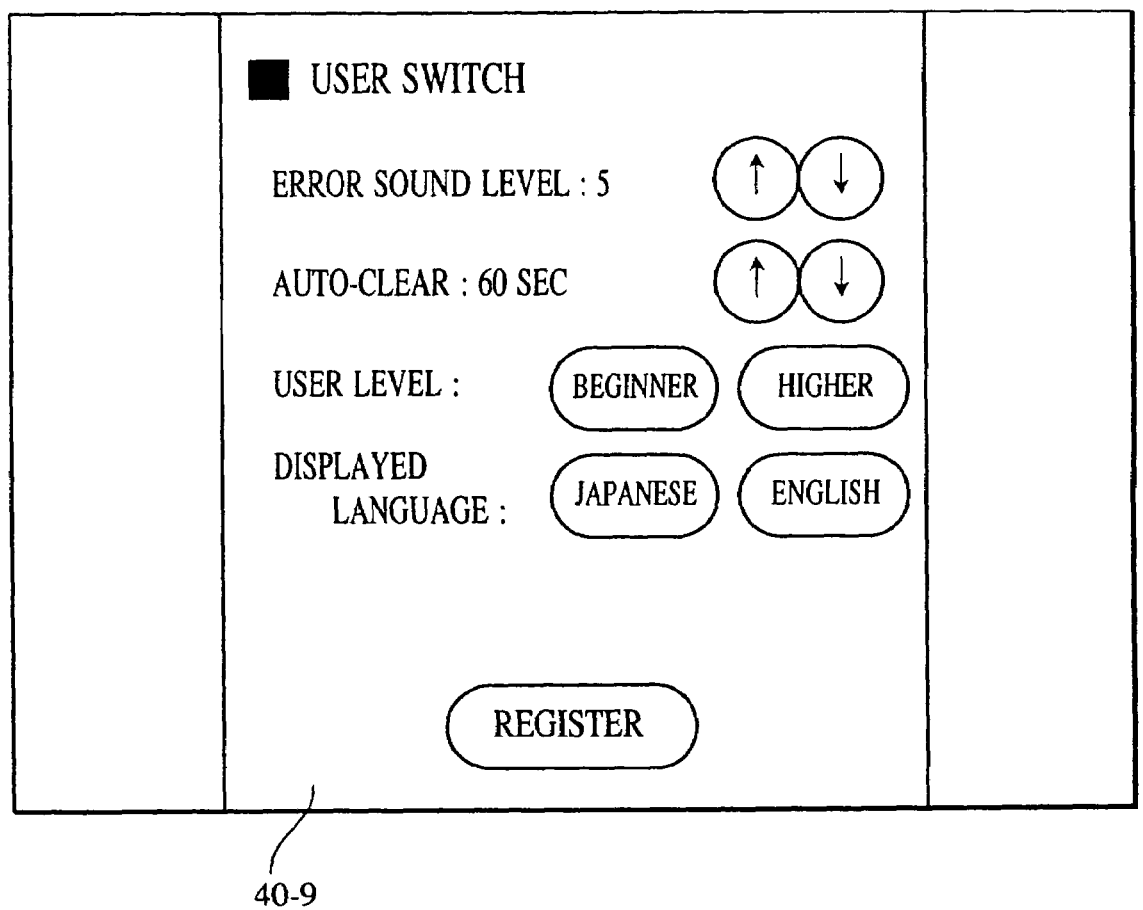
FIG. 20 is a representation showing a user switch setting screen displayed on the control panel of the color copying machine according to the second embodiment of the present invention.

FIG. 20 is a representation showing a user switch setting screen 40-9 displayed when the user switch key in the area 83 shown in FIG. 16 is depressed. On the user switch setting screen 40-9, users can change the user level and the displayed language mentioned above. Two beginner and higher levels are selectable for the user level. The beginner-level users can select one of the three-step resolution values as shown in the screen of FIG. 17, and the higher-level users can select one of the six-step resolution values as shown in the screen of FIG. 16. While the items selectable by the beginner- and higher-level users have been explained in connection with a simple example, it is also possible to change the setting flow between the beginner- and higher-level users, or display a confirmation screen for the beginner-level users.

On the other hand, the displayed language can be selected between Japanese and English. The screen of FIG. 18 is displayed for users who have selected Japanese, and the screen of FIG. 17 is displayed for users who have selected English. The displayed language is similarly changed in other screens as well.

As for other auxiliary functions assigned in the area 83, the user name is the same as in the first embodiment and a user name setting screen is almost the same as shown in FIG. 4. Also, instead of the phone directory in the first embodiment, there is an address notebook in the area 83. This auxiliary function is used to store a plurality of destination network addresses rather than storing a plurality of destination phone numbers, and an address notebook setting screen is almost the same as shown in FIG. 5.

Figure 21:
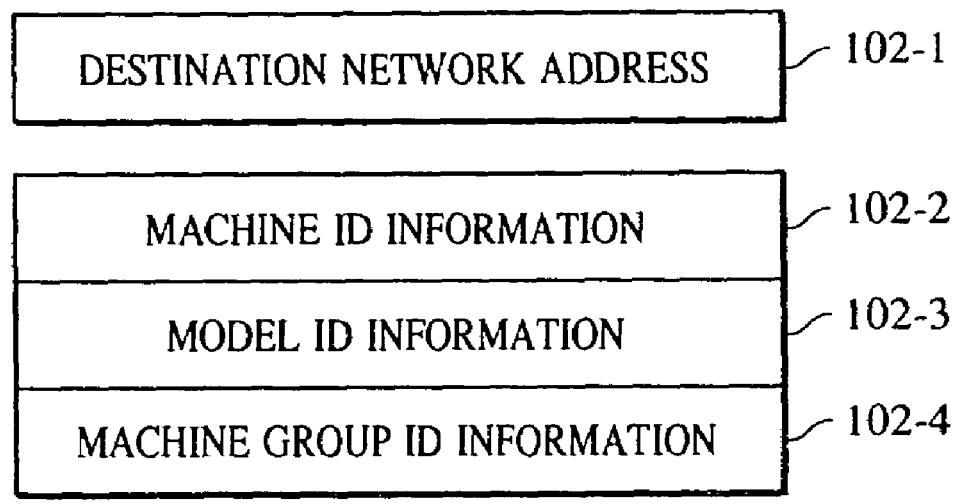
FIGS. 21 to 23 are representations showing individual setting information in the color copying machine according to the second embodiment of the present invention.
Figure 22:
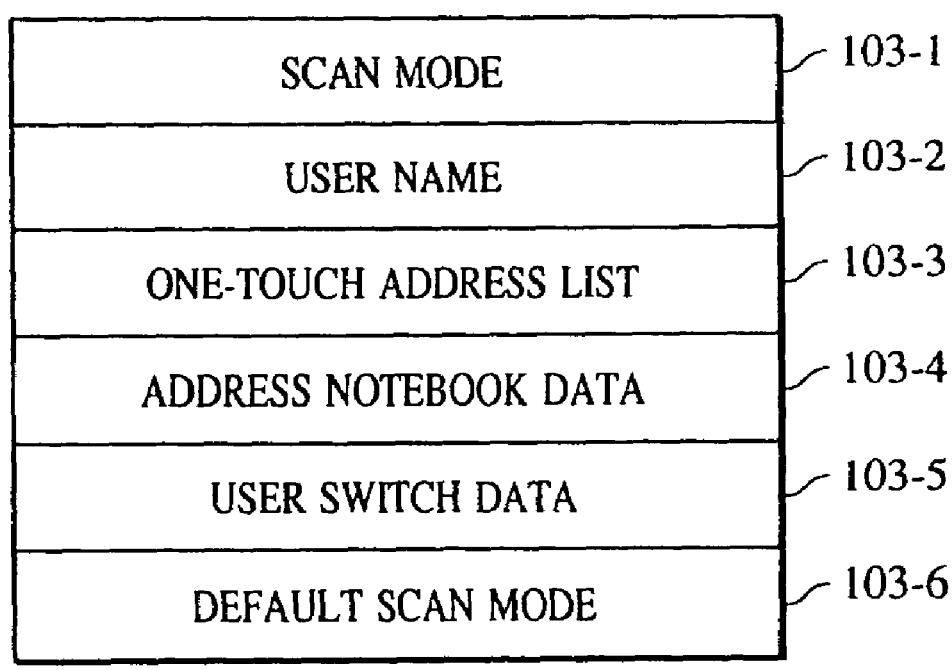
Figure 23:
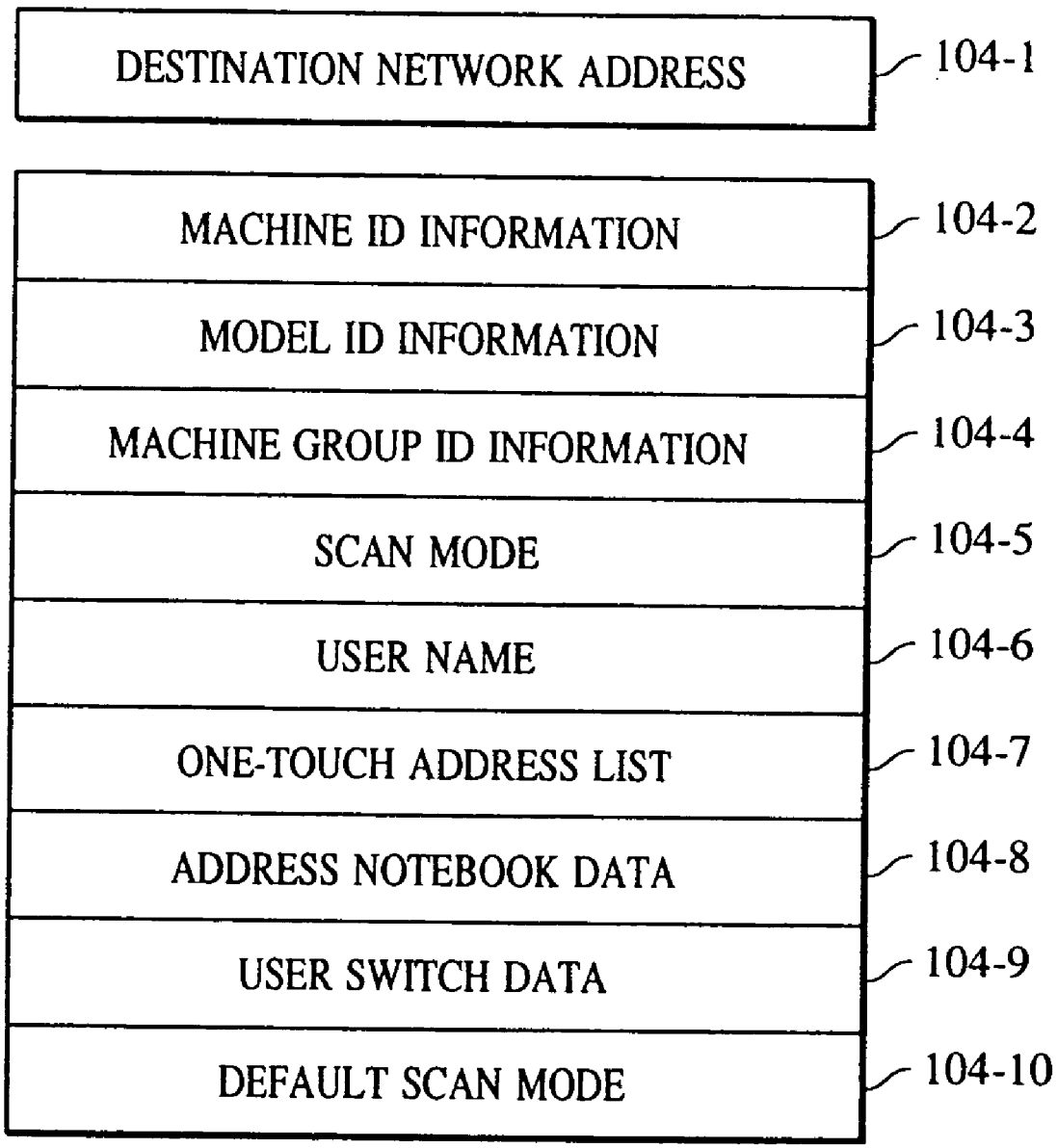

FIGS. 21 to 23 are representations showing individual setting information in the color copying machine 71 according to the second embodiment of the present invention. When an individualize key in the area 82 is depressed in a condition where the ID card 81 is positioned so close to the control panel 8 that the ID information stored in the ID card 81 is readable, machine ID information 102-2, model ID information 102-3, and machine group ID information 102-4 of the color copying machine 71 are transmitted from the color copying machine 71 to the user computer having a network address 102-1 of the destination, as shown in FIG. 21.

The network address 102-1 of the destination is given by the network address of a personal computer possessed by each user which is read out of the ID card 81. In other words, the network address 102-1 of the destination corresponds to the user ID information. The machine ID information 102-2 is information used for identifying each machine. Specifically, the network address of the color copying machine 71 itself set on the screen shown in FIG. 19 is employed as the machine ID information 102-2. The model ID information 102-3 is information used for identifying models of the same type machine and given as, e.g., 1 for a model X color copying machine manufactured by A Co., 2 for a model Y color copying machine manufactured by A Co., and 3 for a model Z color copying machine manufactured by B Co. The model ID information 102-3 may also include version information of each model. The machine group ID information 102-4 is information used for identifying the machine group and given as, e.g., 1 for copying machines, 2 for facsimiles, and 3 for printers.

Upon receiving the machine ID information, etc. from the color copying machine 71, the computer terminal for the user transmits the individual setting information, which is stored for each of the machines controlled by the user through the computer terminal, back to the color copying machine 71. The individual setting information transmitted back from the computer terminal consists of, as shown in FIG. 22, a scan mode 103-1, user name 103-2, one-touch address list 103-3, address notebook data 103-4, user switch data 103-5, and default scan mode 103-6. The user switch data 103-5 includes user levels employed for the individual setting of data and selectable items displayed on the control panel 8, as well as information of the language used. The color copying machine 71 copies the individual setting information transmitted back to it in the respective memory areas of the volatile RAM 19 for the individual setting.

When the register key is depressed after the individual setting has been made on the control panel 8, machine ID information 104-2, model ID information 104-3, machine group ID information 104-4, and the individual setting information at that time (consisting of a scan mode 104-5, user name 104-6, one-touch address list 104-7, address notebook data 104-8, user switch data 104-9, and default scan mode 104-10) are transmitted from the color copying machine 71 to the computer terminal having a network address 104-1 of the destination, as shown in FIG. 23. Upon receiving this individual setting information from the color copying machine 71, the computer terminal for the user rewrites and updates the individual setting information stored therein for each machine.

By transmitting and receiving the individual setting information along with the machine ID information and managing the individual setting information for each machine, as explained above, there is obtained an advantage that the individual setting can be performed for each machine. In the case of employing a nearby low-speed copying machine and a high-speed copying machine in common to a large number of users, for example, frequently used modes of the copying machines are often different from each other because they are employed for different purposes. In such a case, it is convenient that the individual setting can be performed for each machine.

The first embodiment is designed to hold the individual setting information for each machine group such as represented by copying machines and facsimiles, whereas the second embodiment is designed to hold the individual setting information for each machine. However, the second embodiment may be modified so as to hold the individual setting information for each model. This corresponds to an intermediate configuration between the first and second embodiment. More specifically, different data of the individual setting information are held for a model A and a model B which belong to the same machine group, e.g., copying machines, but the same individual setting information is held for a machine A and a machine B which belong to the same model A. This is advantageous in that the individual setting information can be utilized in common for machines of the same model which have the common machine configuration, etc. and different data of the individual setting information can be utilized for each of machines of different models which have different machine configurations from each other.

By transmitting plural items of ID information such as the machine ID information, the model ID information, the machine group ID information, and the user ID information, as explained above, it is also possible to make the computer terminal determine what kind of individual setting information is to be transmitted. More specifically, the computer terminal holding the individual setting information in common to all types of machines for each user determines items of the individual setting information to be transmitted on the basis of the user ID information. Also, the computer terminal holding the individual setting information for each machine group and for each user determines items of the individual setting information to be transmitted on the basis of the machine group ID information and the user ID information. The computer terminal holding the individual setting information for each machine and for each user determines items of the individual setting information to be transmitted in accordance with the machine ID information and the user ID information.

Figure 24:
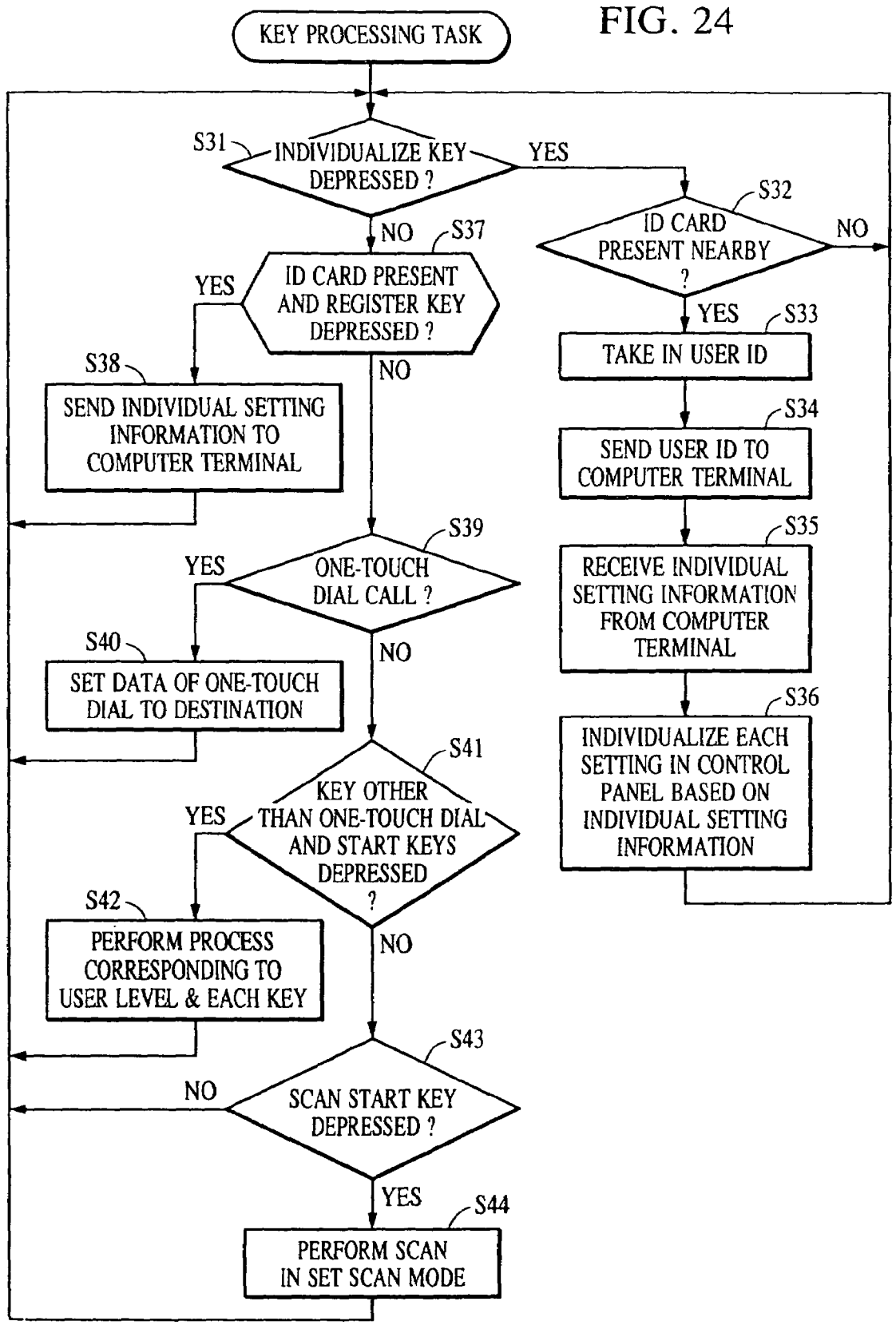
FIG. 24 is a flowchart for explaining a key processing task in the color copying machine according to the second embodiment of the present invention.

FIG. 24 is a flowchart for explaining a key processing task in the color copying machine 71 according to the second embodiment of the present invention. In step S31, it is determined whether the individualize key is depressed or not. If the individualize key is depressed, the process flow goes to step S32 to determine whether the ID card 81 is positioned nearby the non-contact type ID card reader 73, i.e., whether the ID card 81 is positioned or not so close to the non-contact type ID card reader 73 that the contents stored in the ID card 81 can be read by it.

If the ID card 81 is positioned nearby the non-contact type ID card reader 73, the process flow goes to step S33 to take in the user ID information, including the network address of the user's personal computer, from the ID card 81 in a non-contact manner using electric waves. Since the individual setting information to be obtained is stored in the personal computer having the taken-in network address, the user ID information is transmitted to the personal computer having that network address to request the individual setting information. In the second embodiment, since the terminal for which the individual setting information is requested is the user's personal computer and the network address of the user's personal computer represents the user ID, it is not needed to additionally transmit the user ID information to the computer terminal.

In step S35, the color copying machine 71 receives the individual setting information from the user's computer terminal. The individual setting information in the second embodiment includes user levels employed for the individual setting of data and selectable items displayed on the control panel 8, as well as information of the language used. In step S36, each setting in the control panel 8 is individualized or individually carried out in accordance with the received individual setting information.

If the individualize key is not depressed in step S31, the process flow goes to step S37 to determine whether the ID card 81 is detected or not and whether the register key (see the area 82 shown in FIG. 16) indicating registration of the individual setting information is depressed or not by the user. If the ID card 81 is detected and the register key is depressed, the individual setting information is transmitted to the computer terminal of the user to update the individual setting information (see step S38). In the second embodiment, though not shown in FIG. 24, when the ID card 81 is moved away from the ID card ID reader 73 and a predetermined period of time elapses after that, the individual setting state is automatically cleared, followed by returning to the initial state.

If the ID card 81 is not detected or the register key is not depressed in step S37, the process flow goes to step S39 to determine whether any one of the one-touch dial calling keys is depressed or not. If any one of the one-touch dial calling keys is depressed, the process flow goes to step S40 where the network address stored corresponding to the depressed one-touch dial calling key is set as the destination network address.

If no one-touch dial calling key is depressed in step S39, the process flow goes to step S41 to determine whether any key other than the one-touch dial calling keys and a scan start key is depressed or not. If any other key is depressed, the process corresponding to the user level and each depressed key is executed (step S42). The screen and the setting-enable items displayed in this case are individually set in accordance with on the user level and information of the language used.

In step 43, it is determined whether the scan start key is depressed or not. If the scan start key is depressed, the process flow goes to step S44 to start reading of a document image in the scan mode currently set in the control panel 8.

In the second embodiment, the individual setting is made effective when the individualize key is depressed in the condition where the ID card 81 is positioned nearby the ID card reader 73. Altenatively, the individual setting may be automatically made effective when the ID card 81 is positioned nearby the ID card reader 73 and a predetermined period of time elapses in such a condition. The former case is advantageous in that the individual setting can be avoided from being automatically made effective upon the IC card reader responding to another ID card of a passerby or the like than the user who is going to employ the color copying machine 71, whereas the latter case is advantageous in that the user is not required to depress the individualize key.

Also, in the second embodiment, the color copying machine 71 has a network scanner capable of transmitting image data, that is obtained by reading a document image, to a plurality of external machines, and an I/F (interface) used for transmitting the read image data is the same as an I/F used for communication of the individual setting information. However, such an I/F as SCSI (small computer system interface) may be used to construct the color copying machine 71 as a general scanner for transmitting the read image data to one external machine. In this case, a network I/F for communicating the individual setting information with the computer terminal is required in addition to the SCSI for transmitting the read image data.

[Embodiment 3]

A third embodiment of the present invention is basically similar to the second embodiment except in a manner of taking in the user ID and a manner of setting the operating process individually.

Figure 25:
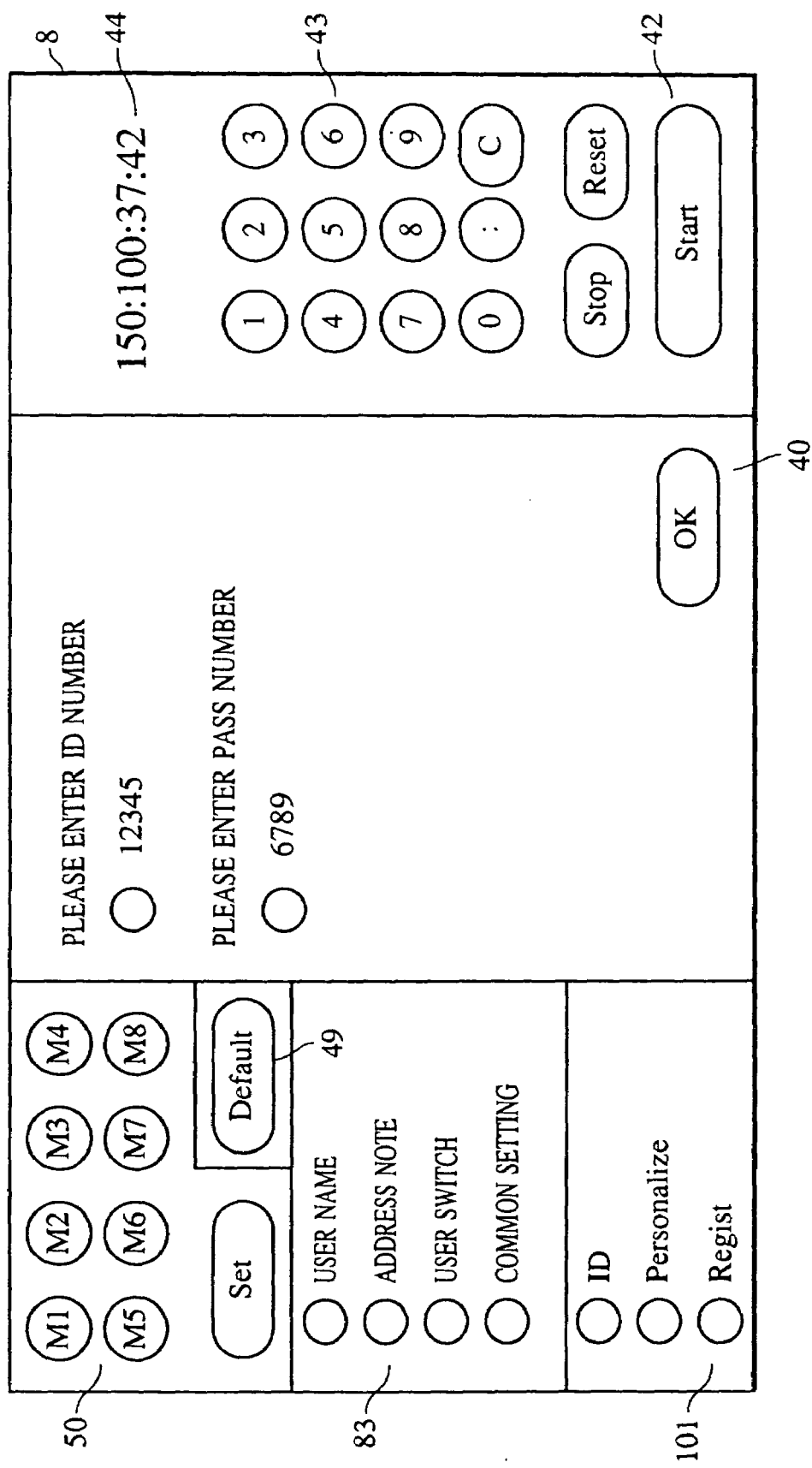
FIG. 25 is a representation showing the arrangement of keys and a display on a control panel of a color copying machine according to a third embodiment of the present invention.

FIG. 25 is a representation showing the arrangement of keys and a display on the control panel 8 of the color copying machine 71 according to the third embodiment. In the third embodiment, the ID card reader is not provided and a user enters ID information through the control panel 8 to acquire a user ID. More specifically, when an ID key disposed in an area 101 of the control panel 8 is depressed, an ID entering screen is displayed in the liquid crystal display portion of the central area 40. After entering an ID number using the numeral ten keys 43, a key positioned adjacent to a displayed secret number (password) is depressed, causing the screen into an entry state of the password. In this state, the password is entered using the numeral ten keys 43. Registration of the user ID is then ended by depressing an OK key.

Thus, the third embodiment requires the user to enter not only the user ID, but also the secret number (password) for verification of the user himself.

Further, the third embodiment is constructed such that the color copying machine 71 receives a script describing the operating process from the computer terminal (that may be the server 3), and programs in the control panel interprets/executes the script to effect display and key-entry setting, thereby enabling the user to carry out the operation.

FIGS. 26 and 27 show, in the script form, examples of an operating process for designating the resolution of transmission in the color copying machine according to the third embodiment of the present invention. FIG. 26 corresponds to the displayed contents and key setting in the area 47 of the screen shown in FIG. 16 according to the second embodiment, and shows an example of a script transmitted from the computer terminal to provide an operating process for higher-class users. In FIG. 26, L101 indicates declaration of the start of a script. L102 indicates an instruction of arrangement of a key named "72 dpi", and L103 means that a process to be executed upon that key being depressed is given by "entering 72 to a variable <res mode>". Likewise, L104 to L113 each indicate an instruction of arrangement of a corresponding one of keys named "100 dpi" to "600 dpi", and contents of an instruction for a process to be executed upon the key being depressed. Finally, L114 indicates the end of the script representing the operating process for the area 47.

The program in the control panel interprets the above-mentioned script and automatically determines the size and arrangement suitable for an operating screen, followed by displaying messages and receiving a key input.

FIG. 27 similarly corresponds to the displayed contents and key setting in the area 47 of the screen shown in FIG. 16 according to the second embodiment, but shows an example of a script transmitted from the computer terminal to provide an operating process for beginner-class users. This example differs from the example of FIG. 26 in that the name of each key is changed to an intuitive name. For example, the key name "standard" is used instead of the key name "72 dpi", and the number of selectable keys is reduced from six to three.

In relation to the individual setting of the operating process, the third embodiment is advantageous in that flexibility of the individual setting is increased because the color copying machine receives the operating process for the control panel in the script form, which is adapted for the individual setting, from the computer terminal as explained above. Stated otherwise, in the third embodiment, operation messages and key positions can be freely selected in accordance with the contents of the script. For example, it is easy to change the displayed language by rewriting the scripts shown in FIGS. 26 and 27, and also easy to increase the number of selectable values of resolution. Another advantage is that since receiving the operating process in the script form enables messages and keys to be converted to have the size and arrangement suitable for the operating screen of the color copying machine through the programs in the control panel of the color copying machine, the same script can be used for different machines having screens of various sizes.

In the third embodiment, as explained above, the color copying machine receives a script adapted for the individual setting from the computer terminal, and the program in the control panel of the color copying machine interprets and displays the script, thereby enabling the user to carry out the operation. Alternatively, the color copying machine may receive control panel programs adapted for the individual setting from the computer terminal and execute the control panel programs, thereby enabling the user to carry out the operation. In this case, the received control panel programs are stored in the volatile RAM 19 of the color copying machine and executed by the CPU 17. This provides an advantage that the individual setting can be performed with greater flexibility than in the third embodiment.

In the third embodiment, the script can be edited in the color copying machine if there is proper input means. Also, the third embodiment may be practiced by a method of editing a script in the computer terminal, or employing a script commercially available from makers.

Figure 28:
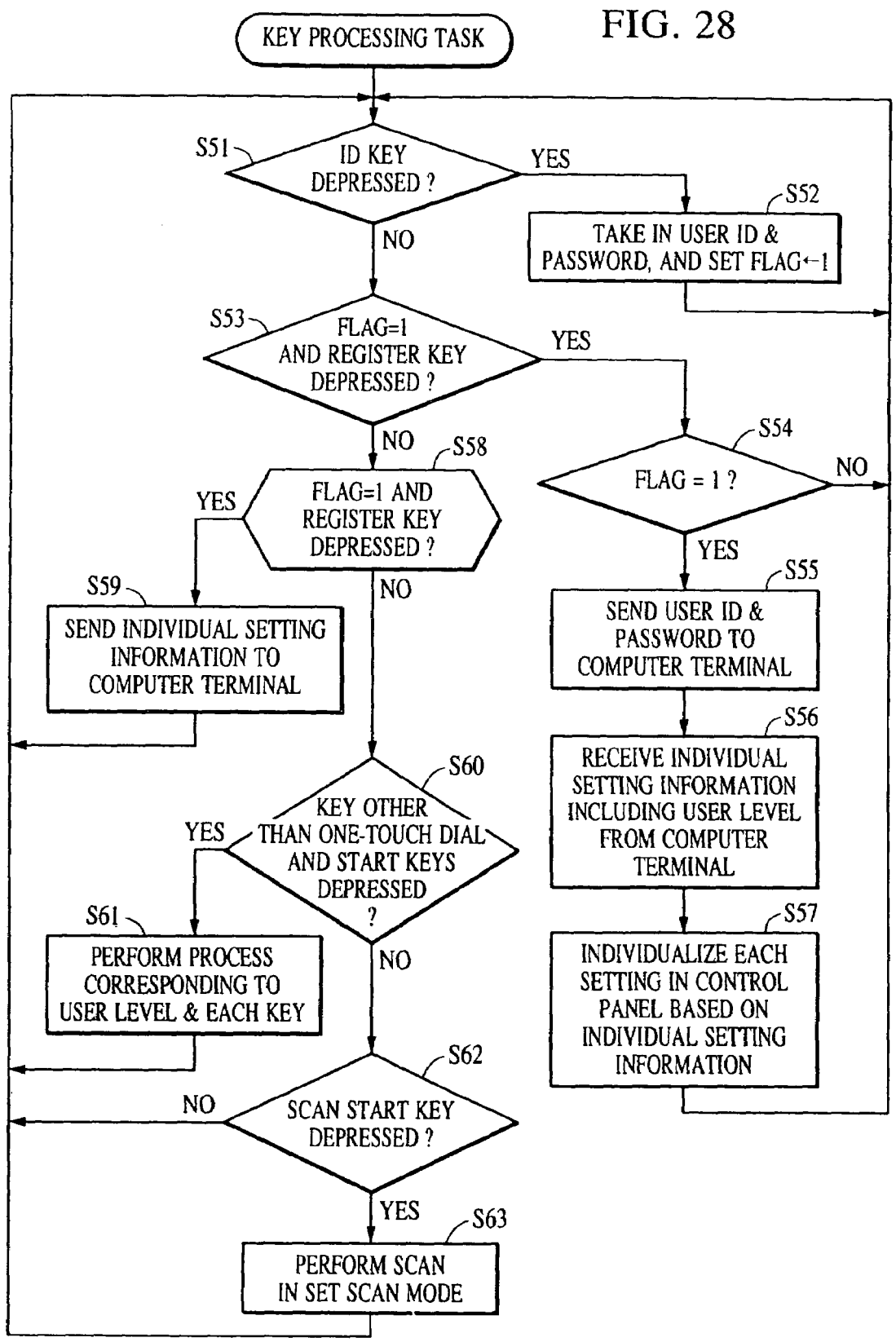
FIG. 28 is a flowchart for explaining a key processing task in the color copying machine according to the third embodiment of the present invention.

FIG. 28 is a flowchart for explaining a key processing task in the color copying machine 71 according to the third embodiment of the present invention. In step S51, it is determined whether the ID key is depressed or not. If the ID key is depressed, the process flow goes to step S52 to display the screen shown in FIG. 25, prompting the user to enter the user ID and the password. After taking in the user ID and the password, a flag indicating that the user ID has been taken in is set to 1.

If the ID key is not depressed in step S51, it is determined in step S53 whether the individualize key is depressed or not. If the individualize key is depressed, the process flow goes to step S54 to determine whether the flag is set to 1 or not, i.e., whether the user ID has been already taken in. If the user ID has been already taken in, the user ID and the password are transmitted to the computer terminal (step S55).

In step S56, the individual setting information including a script which describes the operating process is received from the computer terminal in accordance with the user ID and the password transmitted thereto. Though not shown in FIG. 28, if the transmitted password is not correct in step S55, the color copying machine cannot receive the individual setting information and an error message is informed instead. Accordingly, the process flow goes back to step S51 after displaying the error message. In step S57, each setting in the control panel 8 is individualized or individually performed in accordance with the received individual setting information.

In step S58, it is determined whether the flag is set to 1 or not and whether the register key indicating registration of the individual setting information is depressed or not. If the flag is set to 1 and the register key is depressed, the individual setting information set in the color copying machine at the present is transmitted to the computer terminal to update the individual setting information (step S59).

On the other hand, if the flag is not set to 1 and the register key is not depressed in step S58, the process flow goes to step S60 to determine whether any key other than the register key and the scan start key is depressed or not. If any other key is depressed, the process corresponding to the user level and each depressed key is executed (step S61). In this case, turn-over of the operating screens, items displayed on the operating screens, and items selectable on the operating screens are changed in accordance with the script which is included in the individual setting information and describes the operating process.

Though not shown in FIG. 28, the process executed upon one of the one-touch address (dial calling) keys being depressed is also included in the processes of step S60 and step S61. Also, in the third embodiment, when the reset key is depressed, or when no operation is performed for a predetermined period of time, the individual setting state is cleared, followed by returning to the initial state, whereupon the flag is set to 0.

In the embodiments explained above, the user ID is taken in by using a contact/non-contact type ID card and manually inserting the contact type ID card. However, the user ID can be entered in any other suitable manner so long as the user ID is taken in with certainty. It is possible to, for example, enter the user ID by voice, identify the user by voice, or identify the user by reading the iris, face, finger print, name plate or the like by a camera.

Also, the above embodiments have been explained in connection with the individual setting in an ordinary image reading apparatus which reads an image on a document in the form of a paper sheet and transmits read image data to another apparatus. However, the present invention is also applicable to any other apparatus which has a mode capable of enabling the individual setting to be carried out. For example, the present invention can be applied to a film scanner which reads a photographic film and then transmits read image data to another apparatus.

Further, while in the above embodiments respective apparatus or machines are interconnected by using a bus-type network, the bus-type network may be replaced by any suitable other type network so long as it can connect those apparatus to one another. In addition, those apparatus may be interconnected wirelessly rather than using wires.

Moreover, in the above embodiments, the computer terminal storing the individual setting information is constituted by one specific server or a plurality of servers using personal computers of users. Alternatively, one facsimile or scanner may also function as such a server storing the individual setting information.

As described above, according to the embodiments, various settings of an image processing apparatus are held in a computer terminal for each user outside the apparatus and when a user employs the apparatus, the apparatus receives the various settings for the user from the computer terminal and performs the various settings of the apparatus in an individual manner. This provides an advantage that an image processing apparatus capable of giving remarkably improved operability to the user is achieved.

Practically, the setting performed on the control panel can be set in an individual manner specific to each user, and various settings of different image processing apparatus can be performed with the same operability. This provides an advantage that setting of a large amount of data and storage of image data, which have been difficult in the past, can be realized by using the computer terminal on a network.

The processing of the facsimile 1 including the above-explained operation shown in the flowchart of FIG. 14 and the processing of the color copying machine 71 including the above-explained operation shown in the flowcharts of FIGS. 24 and 28 are controlled by the CPU 17 in accordance with program data stored in the ROM 18. Also, the processing of such computer terminals as the server 3 and the user computers 3-1, 3-2 is controlled by an MPU of the relevant computer terminal in accordance with an execution program stored in a memory of the computer terminal.

The present invention may be applied to not only a system comprising a plurality of equipment (e.g., a host computer, an interface unit, a reader and a printer), but also an apparatus comprising a single equipment (e.g., a copying machine and a facsimile).

The present invention can also be implemented by supplying, to an apparatus or system which is connected to various devices so that the devices are operated to realize any of the functions of the above-described embodiments, program codes of software for realizing the function of any embodiment, and causing a computer (CPU or MPU) in the apparatus or system to operate the various devices in accordance with the loaded program codes.

In such a case, the program codes of software serve in themselves to realize the function of any of the above-described embodiments; hence the program codes themselves and means for supplying the program codes to the computer, for example, a storage medium storing the program codes, constitutes the present invention.

Storage mediums for storing the program codes may be, e.g., floppy disks, hard disks, optical disks, photo-magnetic disks, CD-ROM's, magnetic tapes, nonvolatile memory cards, and ROM's.

Also, the function of any of the above-described embodiments is realized by not only a computer executing the program codes supplied to it, but also the program codes cooperating an OS (Operating System), any other suitable application software or the like which is working on the computer. It is thus a matter of course that the program codes in the latter case are also involved in modified embodiments of the present invention.

Further, the present invention involves such a case where the supplied program codes are stored in a memory built in a function add-in board of a computer or a function add-in unit connected to the computer, and a CPU or the like incorporated in the function add-in board or unit then executes part or whole of the actual process in accordance with instructions from the program codes, thereby realizing the function of any of the above-described embodiments.

The present invention has been described above in connection with several preferred embodiments, the present invention is not limited to the illustrated embodiments and may be modified in various ways.

What is claimed is:

1. An image processing apparatus comprising:
   an input unit, adapted to input image data;
   a processor, adapted to perform a job based on the image data input by said input unit;
   an operation unit, adapted to display an operation screen for the job to be performed by said processor and accept a user operation based on the operation screen;
   an entering unit, adapted to enter identification information corresponding to a user;
   a sender, adapted to send the identification information entered by said entering unit to an external server;
   a receiver, adapted to receive language information identifying a language used for a term to be displayed in the operation screen of said operation unit from the external server; and
   a controller, adapted to select, from among a plurality of languages, a language identified by the language information received by said receiver.

2. An apparatus according to claim 1, wherein the plurality of languages includes Japanese and English.

3. An apparatus according to claim 1, wherein said operation unit displays an setting screen in which the user sets a language used for the term to be displayed in the operation screen of said operation unit.

4. An apparatus according to claim 1, wherein the term indicates one of a plurality of items selectable as a parameter for processing the image data inputted by said input unit.

5. An apparatus according to claim 1, wherein said processor performs the job for sending the image data input by said input unit to a designated destination.

6. An image processing method comprising the steps of:
   inputting image data;
   performing a job based on the image data input in said inputting step;
   displaying an operation screen for the job to be performed in said performing step;
   accepting a user operation based on the operation screen;
   entering identification information corresponding to a user;
   sending the identification information entered in said entering step to an external server;
   receiving language information identifying a language used for a term to be displayed in the operation screen from the external server; and
   selecting, from among a plurality of languages, a language identified by the language information received in said receiving step.

* * * * *

UNITED STATES PATENT AND TRADEMARK OFFICE
CERTIFICATE OF CORRECTION

| | | |
|---|---|---|
| PATENT NO. | : 7,154,618 B2 | Page 1 of 3 |
| APPLICATION NO. | : 10/669332 | |
| DATED | : December 26, 2006 | |
| INVENTOR(S) | : Toshihiro Kadowaki | |

It is certified that error appears in the above-identified patent and that said Letters Patent is hereby corrected as shown below:

ON COVER PAGE AT (56) FOREIGN PATENT DOCUMENTS

"JP HEI9(1997)-130532 5/1997" should read --JP 9-130532 5/1997--.

ON COVER PAGE AT (56) OTHER PUBLICATIONS

In "Patent Abstracts of Japan ,vol. 016, . . .": "JP 04081069" should read --JP 04-081069--; and
In "Patent Abstracts of Japan ,vol. 018, . . .": "JP 05292281" should read --JP 05-292281--.

SHEET 3

FIG. 3, "DAR" should read --DARK--.

SHEET 15

FIG. 16, "DAR" should read --DARK--; and "Regist" should read --Register--.

SHEET 23

FIG. 25, "Regist" should read --Register--.

COLUMN 2

Line 34, "Anther" should read --Another--.

COLUMN 5

Line 12, "in" should be deleted;
Line 21, "out" should read --out of--; and
Line 48, "time of period." should read --period of time.--.

COLUMN 7

Line 7, "numeral ten" should read --ten numeral--; and
Line 25, "form" should read --form of--.

UNITED STATES PATENT AND TRADEMARK OFFICE
CERTIFICATE OF CORRECTION

PATENT NO. : 7,154,618 B2
APPLICATION NO. : 10/669332
DATED : December 26, 2006
INVENTOR(S) : Toshihiro Kadowaki It is certified that error appears in the above-identified patent and that said Letters Patent is hereby corrected as shown below:

COLUMN 8

Line 21, "panel control" should read --control panel--.

COLUMN 10

Line 44, "ace" should read --are--.

COLUMN 11

Line 13, "turned," should read --turned on,--.

COLUMN 13

Line 1, "those" should read --the--; and
Line 46, "so-that" should read --so that--.

COLUMN 15

Line 22, "second" should read --first--;
Line 36, "connected" should read --connected to--; and
Line 37, "memory 74a" should read --memory 74a that--.

COLUMN 16

Line 11, "include" should read --includes--.

COLUMN 17

Line 35, "numeral ten" should read --ten numeral--; and
Line 65, "setting;" should read --setting:--.

COLUMN 18

Line 2, "ing)," should read --ing,--.

UNITED STATES PATENT AND TRADEMARK OFFICE
CERTIFICATE OF CORRECTION

PATENT NO. : 7,154,618 B2
APPLICATION NO. : 10/669332
DATED : December 26, 2006
INVENTOR(S) : Toshihiro Kadowaki It is certified that error appears in the above-identified patent and that said Letters Patent is hereby corrected as shown below:

COLUMN 21

Line 27, "ID" (second occurrence) should be deleted;
Line 46, "on" should be deleted; and
Line 62, "like" should read --like other--.

COLUMN 22

Line 25, "numeral ten" should read --ten numeral--; and
Line 29, "numeral ten" should read --ten numeral--.

COLUMN 24

Line 39, "finger print," should read --fingerprint,--.

COLUMN 25

Line 48, "cooperating" should read --cooperating with--.

COLUMN 26

Line 30, "an" should read --a--.

Signed and Sealed this

Twenty-fifth Day of March, 2008

JON W. DUDAS
*Director of the United States Patent and Trademark Office*